(12) United States Patent
Osawa et al.

(10) Patent No.: US 8,556,593 B2
(45) Date of Patent: Oct. 15, 2013

(54) METHOD OF CONTROLLING COUNTER-ROTATING AXIAL-FLOW FAN

(75) Inventors: Honami Osawa, Nagano (JP);
Naruhiko Kudo, Nagano (JP);
Yoshihiko Aizawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 536 days.

(21) Appl. No.: 12/740,581

(22) PCT Filed: Oct. 28, 2008

(86) PCT No.: PCT/JP2008/069560
§ 371 (c)(1),
(2), (4) Date: Apr. 29, 2010

(87) PCT Pub. No.: WO2009/057598
PCT Pub. Date: May 7, 2009

(65) Prior Publication Data
US 2010/0260616 A1    Oct. 14, 2010

(30) Foreign Application Priority Data

Oct. 29, 2007    (JP) ................................ 2007-280353

(51) Int. Cl.
*F04B 41/06*    (2006.01)
(52) U.S. Cl.
USPC .............. 417/2; 417/44.11; 417/53; 417/426; 361/695
(58) Field of Classification Search
USPC ............... 417/2, 32, 44.1, 44.11, 47, 53, 426, 417/423.1; 361/694, 695; 165/287
See application file for complete search history.

(56) References Cited

U.S. PATENT DOCUMENTS

| | | | |
|---|---|---|---|
| 6,537,019 B1 * | 3/2003 | Dent | 415/61 |
| 6,735,499 B2 * | 5/2004 | Ohki et al. | 700/299 |
| 6,781,258 B2 * | 8/2004 | Hashimoto | 307/87 |
| 2002/0079746 A1 | 6/2002 | Hashimoto | |
| 2002/0140389 A1 | 10/2002 | Ohki et al. | |
| 2005/0106026 A1 * | 5/2005 | Oosawa et al. | 416/198 R |
| 2007/0076372 A1 * | 4/2007 | Lin | 361/695 |

FOREIGN PATENT DOCUMENTS

| | | |
|---|---|---|
| CN | 1566713 A | 1/2005 |
| CN | 1751184 A | 3/2006 |
| CN | 1796796 A | 7/2006 |
| CN | 1916867 A | 2/2007 |
| JP | 37-32888 | 12/1962 |
| JP | 61-14798 | 1/1986 |

(Continued)

*Primary Examiner* — Peter J Bertheaud
(74) *Attorney, Agent, or Firm* — Rankin, Hill & Clark LLP

(57) ABSTRACT

A counter-rotating axial-flow fan may be controlled to improve both cooling efficiency and operating efficiency. A first motor and a second motor are started in a given starting mode. Then, if the temperature of an object to be cooled is higher than a given reference temperature, the rotational speed of the first motor and the rotational speed of the second motor are controlled in a predetermined cooling efficiency mode that gives priority to cooling the object to be cooled over the operating efficiency of the counter-rotating axial-flow fan. If the temperature of the object to be cooled is equal to or lower than the given reference temperature, the rotational speeds of the first and second motors are controlled in a predetermined operating efficiency mode that maintains the object to be cooled at a temperature equal to or lower than the given reference temperature and reduces the power consumption of the counter-rotating axial-flow fan.

31 Claims, 18 Drawing Sheets

(56) References Cited

FOREIGN PATENT DOCUMENTS

| | | |
|---|---|---|
| JP | 61-184895 | 11/1986 |
| JP | 02-238195 | 9/1990 |
| JP | 09-268756 | 10/1997 |
| JP | 2004-278307 | 10/2004 |
| TW | I264502 B | 10/2006 |

* cited by examiner

From ST152

Amount of change γ1 for N1 having larger effects >
Amount of change γ2 for N2 having smaller effects — ST150

To ST153

METHOD OF CONTROLLING COUNTER-ROTATING AXIAL-FLOW FAN

TECHNICAL FIELD

The present invention relates to a method of controlling a counter-rotating axial-flow fan used for cooling an interior of an electric apparatus or the like.

BACKGROUND ART

As described in Japanese Patent Application Publication No. 2004-278370 (JP2004-278370A), the ratio of rotational speeds between counter-rotating first and second impellers of a counter-rotating axial-flow fan is usually fixed.

As disclosed in Japanese Patent Application Publication No. 02-238195 (JP02-238195A), when a counter-rotating axial-flow fan is used for forced air cooling, the rotational speed of a first motor for rotating a first impeller and that of a second motor for rotating a second impeller are separately controlled. Namely, the ratio of rotational speeds between the first and second impellers is changed according to varying ambient temperature. Specifically, in this disclosure, the rotational speed of the second impeller located downstream is set lower than that of the first impeller located upstream if it is necessary to increase a flow rate in order to reduce noise, and the second impeller located downstream is stopped if an airflow is sufficient.

SUMMARY OF INVENTION

Technical Problem

Existing methods of controlling a counter-rotating axial-flow fan take noise reduction into consideration, but place no focus on the improvement of both cooling efficiency and operating efficiency. Consequently, it takes a long time until an object to be cooled is cooled down to a given reference temperature, or the operating efficiency is maintained at an unfavorable level after the object to be cooled has been cooled down to the given reference temperature.

An object of the present invention is to provide a method of controlling a counter-rotating axial-flow fan by which both cooling efficiency and operating efficiency may be improved.

Another object of the present invention is to provide a method of controlling a counter-rotating axial-flow fan by which operating efficiency may be increased as much as possible.

Solution to Problem

In one or more embodiments of the present invention, a counter-rotating axial-flow fan to be controlled may comprise: a housing including an air channel having a suction port at one end thereof and a discharge port at the other end thereof; a first impeller including a plurality of first blades that rotates in the air channel in the vicinity of the suction port; a first motor for rotating the first impeller around an axial line; a second impeller including a plurality of second blades that rotates in the air channel in the vicinity of the discharge port; and a second motor for rotating the second impeller counter to the first impeller around the axial line. According to the present invention, the rotational speeds of the first and second motors of the counter-rotating axial-flow fan are controlled such that the object to be cooled may be equal to or lower than a given reference temperature.

In one or more embodiments of the present invention, a cooling efficiency mode and an operating efficiency mode may be used to control the rotational speeds of the first and second motors of the counter-rotating axial-flow fan after the first and second motors, which have not been driven, are started according to a given starting mode. The rotational speed of the first motor and that of the second motor are controlled according to a predetermined cooling efficiency mode if the temperature of the object to be cooled is higher than the given reference temperature. The predetermined cooling efficiency mode gives priority to cooling the object to be cooled over reduced power consumption or operating efficiency of the counter-rotating axial-flow fan. The rotational speed of the first motor and that of the second motor are controlled according to a predetermined operating efficiency mode if the temperature of the object to be cooled is equal to or lower than the given reference temperature. The predetermined operating efficiency mode maintains the object to be cooled at a temperature equal to or lower than the given reference temperature and reduces the power consumption of the counter-rotating axial-flow fan. In the predetermined operating efficiency mode, the ratio of rotational speeds between the first and second motors may be fixed or changed.

In one or more embodiments of the present invention, the rotational speed of the first motor and that of the second motor may be controlled according to the predetermined cooling efficiency mode, which gives priority to cooling the object to be cooled over reduced power consumption or operating efficiency of the counter-rotating axial-flow fan, if the temperature of the object to be cooled is higher than the given reference temperature. As a result, the object to be cooled may quickly be cooled down to or below the given reference temperature. Once the object to be cooled has been cooled down to or below the given reference temperature, the rotational speed of the first motor and that of the second motor may be controlled according to the predetermined operating efficiency mode defined to reduce the power consumption of the counter-rotating axial-flow fan. As a result, the power consumption may be reduced after the object to be cooled has been cooled down, thereby efficiently operating the counter-rotating axial-flow fan.

The term "an object to be cooled" used herein includes a heat-emitting electronic component such as a CPU and an atmosphere where a heat-emitting component is placed. Counter-rotating axial-flow fans may be used in different situations: for blowing air onto an object to be cooled, for sucking a cooling medium (usually, air) into a space, and for discharging a cooling medium out of a space.

The present invention is applicable to not only a single counter-rotating axial-flow fan but also a plurality of counter-rotating axial-flow fans to be operated at one time.

Whether or not the temperature of the object to be cooled is equal to or lower than the given reference temperature may be determined by directly measuring the temperature of the object to be cooled with a temperature sensor or by indirect means such as computing. For example, whether or not the temperature of the object to be cooled is equal to or lower than the given reference temperature may be determined based on an output from a temperature sensor disposed in an atmosphere where the object to be cooled is placed. In this situation, the output from the temperature sensor indicates the temperature of the atmosphere which has been heated with heat emitted from the object to be cooled, and the temperature of the object to be cooled is indirectly measured. If the object to be cooled is the air in a space, whether or not the temperature of the air in the space is equal to or lower than the given reference temperature may be determined based on an output from a temperature sensor installed at the counter-rotating axial-flow fan for air cooling. In this situation, the temperature of the air in the space is determined based on the temperature of a cooling medium sucked or discharged by the counter-rotating axial-flow fan. If the temperature of the object to be cooled is high, the temperature of a field or atmosphere where the counter-rotating axial-flow fan is placed as well as the temperature of the counter-rotating axial-flow fan is accordingly elevated. Therefore, the temperature of the object to be cooled may also be determined indirectly based on the temperature of the counter-rotating axial-flow fan itself. With this, cooling the object to be cooled may be performed without considering where to place the temperature sensor.

In one or more embodiments of the present invention, the starting mode may be configured to increase the rotational speeds of the first and second motors up to respective target rotational speeds. Namely, the rotational speeds of the first and second motors may be increased up to the respective target rotational speeds regardless of the temperature of the object to be cooled during the starting mode. Alternatively, the starting mode may be configured to gradually or stepwisely increase the rotational speeds of the first and second motors for a given period after the motors have been started. The given period may be determined such that subsequent controlling should steadily be performed, taking account of the features of motors used and the system impedance of a system to be cooled. If it is known that the temperature of the object to be cooled is always higher than the reference temperature at the time of startup, the starting mode may be configured to start measuring the temperature of the object to be cooled at the time of startup and thereafter, and to increase the rotational speeds of the first and second motors such that the temperature of the object to be cooled may be equal to or lower than the reference temperature. In this case, the starting mode includes a part of the cooling efficiency mode.

The cooling efficiency mode may arbitrarily be configured, provided that priority is given to cooling the object to be cooled over operating efficiency of the counter-rotating axial-flow fan. For example, the cooling efficiency mode may be configured to fix a ratio of rotational speeds between the first and second motors as expressed in N1:N2 where N1 denotes the rotational speed of the first motor and N2 denotes that of the second motor, and to change a rate of change in rotational speed for the first and second motors such that the temperature of the object to be cooled may be equal to or lower than the given reference temperature. In this mode, the rotational speeds of the first and second motors may readily be controlled by fixing the ratio of rotational speeds between the first and second motors and changing the rate of change in rotational speed for the first and second motors.

The cooling efficiency mode may alternatively be configured to change the ratio of rotational speeds between the first and second motors, N1:N2, such that the temperature of the object to be cooled may be equal to or lower than the given reference temperature. In this mode, the ratio N1:N2 of rotational speeds between the first and second motors is changed, and it is possible to select an amount of change or a rate of change in rotational speed that is appropriate for increasing a flow rate depending on the situation, thereby shortening the time until the object to be cooled reaches a temperature within a given range of reference temperature. To change the ratio of rotational speeds, the rotational speed of at least one of the first and second motors may be changed. Preferably, the amount of change or the rate of change in rotational speed for one of the first and second motors, which gives larger effects to the improvement of cooling performance than the other motor when rotated, may be larger than the amount of change or the rate of change for the other motor. In a typical counter-rotating axial-flow fan, the one motor that gives larger effects to the improvement of cooling performance is a first motor for rotating a first impeller disposed in the vicinity of a suction port, and the other motor is a second motor for rotating a second impeller disposed in the vicinity of a discharge port. Theoretically, however, a reverse association of the motors is possible depending on the number and shape of blades. Cooling performance may be improved by setting the amount of change or the rate of change in rotational speed for one motor that gives larger effects to the improvement of cooling performance to be larger than the amount of change or the rate of change for the other motor, thereby shortening the time required for cooling.

Although the rotational speeds of the first and second motors may continuously be changed, the rotational speeds may also be changed by respective constant amounts of change in rotational speed. Computer-aided controlling may be facilitated by changing the rotational speeds of the first and second motors by the respective constant amounts of change.

The operating efficiency mode of the present invention may arbitrarily be configured, provided that the power consumption in this mode is lower than that in the cooling efficiency mode and the temperature of the object to be cooled in the operating efficiency mode does not exceed the given reference temperature. In one or more embodiments of the present invention, for example, the operating efficiency mode may be configured to fix the ratio of rotational speeds, N1:N2, between the first and second motors, stepwisely decrease the rotational speeds of the first and second motors by a rate of change in rotational speed smaller than the rate of change used in the cooling efficiency mode until the temperature of the object to be cooled is raised or becomes higher than the given reference temperature, and define the rotational speeds of the first and second motors immediately before the temperature of the object to be cooled is raised or becomes higher than the given reference temperature, as respective steady rotational speeds for a period during which the temperature of the object to be cooled is equal to or lower than the given reference temperature. In this mode, the rotational speeds appropriate for improving the operating efficiency may more accurately be determined since the rotational speeds are stepwisely decreased by a smaller rate of change in rotational speed for the first and second motors. In this operating efficiency mode, it may be possible to change the ratio N1:N2 of the rotational speeds N1 and N2 of the first and second motors that have finally been set in the cooling efficiency mode.

Alternatively, the operating efficiency mode may be configured with a focus being placed on the rotational speed of one of the first and second motors that gives larger effects to the improvement of cooling performance than the other motor. In this mode, the rotational speed of one of the first and second motors that gives larger effects to the improvement of cooling performance than the other motor is first decreased by an amount of change or a rate of change in rotational speed smaller than the amount of change or the rate of change in rotational speed used in the cooling efficiency mode until the temperature of the object to be cooled is raised or becomes higher than the given reference temperature. Then, the rotational speed of the one motor immediately before the temperature of the object to be cooled is raised or becomes higher than the given reference temperature as a steady rotational speed of the one motor for a period during which the temperature of the object to be cooled is equal to or lower than the given reference temperature. The rotational speed of the other motor is subsequently decreased by an amount of change or a rate of change in rotational speed smaller than the amount of change or the rate of change used in the cooling efficiency mode until the temperature of the object to be cooled is raised or becomes higher than the given reference temperature. Then, the rotational speed of the other motor immediately before the temperature of the object to be cooled is raised or becomes higher than the given reference temperature as a steady rotational speed of the other motor for a period during which the temperature of the object to be cooled is equal to or lower than the given reference temperature. In this mode, the time until appropriate rotational speeds are determined may be shortened since the rotational speed of the one motor having larger effects on the improvement of cooling performance is decreased earlier than the other motor. Further, the rotational speed of the other motor having smaller effects on the improvement of cooling performance is decreased later than the one motor. Therefore, delicate adjustments of the rotational speeds may be performed, thereby increasing the accuracy of determining the rotational speeds.

In the operating efficiency mode, the rotational speed of only one of the first and second motors may be changed.

In one or more embodiments of the present invention, the rotational speeds of the first and second motors of the counter-rotating axial-flow fan may be controlled such that the temperature of the object to be cooled may be equal to or lower than the given reference temperature as follows: the ratio of rotational speeds between the first and second motors is determined using a system impedance for increased operating efficiency, and the preferable ratio of rotational speeds thus determined is used from the beginning to control the rotational speeds of the first and second motors. First, a counter-rotating axial-flow fan for data measurements is prepared and then flow rate-static pressure characteristics are measured with the ratio of rotational speeds between first and second motors of the counter-rotating axial-flow fan for data measurements being fixed as a certain ratio. Meanwhile, changes in rotational speed of one of the first and second motors of the counter-rotating axial-flow fan for data measurements or changes in total rotational speed of the first and second motors of the counter-rotating axial-flow fan for data measurements as well as changes in motor current value of one of the first and second motors of the counter-rotating axial-flow fan for data measurements or changes in total motor current value of the first and second motors of the counter-rotating axial-flow fan for data measurements are also measured. Results thus obtained from the measurements are prepared as first basic data. Next, different settings are defined for the ratio of rotational speeds between the first and second motors of the counter-rotating axial-flow fan for data measurements. In other words, the ratio of rotational speeds between the first and second motors of the counter-rotating axial-flow fan for data measurements is changed and flow rate-static pressure characteristics are measured each time. Then, a maximum efficiency point is obtained for each ratio of rotational speeds. A relationship among the measured flow rate-static pressure characteristic, the ratio of rotational speeds, and the maximum efficiency point for each ratio of rotational speeds is defined. Thus, second basic data defining the aforementioned relationship is prepared.

A counter-rotating axial-flow fan to be controlled is installed in a system which includes an object to be cooled. First and second motors of the counter-rotating axial-flow fan to be controlled are rotated with the same ratio of rotational speeds as that used in the measurements to obtain the first basic data. Then, a system impedance curve for the system is obtained using the first basic data as well as the rotational speed of one of the first and second motors or the total rotational speed of the first and second motors and the motor current value of one of the first and second motors or the total motor current value of the first and second motors. The system impedance curve is constituted from a quadratic curve passing through a zero point and an operating point of the flow rate-static pressure characteristic. Next, the system impedance curve is compared with the second basic data to determine as an appropriate ratio of rotational speeds a ratio of rotational speeds at which the maximum efficiency point falls on the system impedance curve or a ratio of rotational speeds at which the system impedance curve approaches closest to the maximum efficiency point. Then, the appropriate ratio of rotational speeds thus determined is fixed, and the rotational speeds of the first and second motors are controlled in a given cooling mode such that the temperature of the object to be cooled may be equal to or lower than a given reference temperature.

The term "system impedance" used herein refers to wind resistance in cooling an apparatus or a system where an object to be cooled is placed. High system impedance means that wind hardly flows and it takes a long time to cool down the object to be cooled. Low system impedance means that wind readily flows and it does not take a long time to cool down the object to be cooled. As long as the flow rate remains unchanged, high system impedance makes the cooling time longer and the operating efficiency worse. For example, if a foreign object or material is sucked into the suction port or the discharge port is partially blocked, the system impedance will increase. If the system impedance increases while the counter-rotating axial-flow fan is in operation, the temperature of the object to be cooled will be raised. According to the present invention, the system impedance is obtained to determine a ratio of rotational speeds, $N_1:N_2$, appropriate for obtaining optimal operating efficiency with the obtained system impedance. The appropriate ratio of rotational speeds is maintained in cooling the object to be cooled while controlling the rotational speeds of the first and second motors. As a result, the operating efficiency is optimized at the time that the temperature of the object to be cooled becomes equal to or lower than the given reference temperature.

Once the optimal ratio of rotational speeds and optimal rotational speeds have been determined, the optimal ratio of rotational speeds and optimal rotational speeds should be maintained. However, ambient conditions of the system including the object to be cooled may be varied and the system impedance may accordingly be varied. To cope with such situation, the system may periodically be reset and a system impedance for the system may be re-determined and an optimal ratio of rotational speeds may be determined, thereby restoring the operating efficiency to a preferable condition.

If a large amount of comprehensive first and second basic data is available, optimal operating efficiency may be obtained. If the data are rough or data sampling is coarse, resulting operating efficiency will be worse. To cope with this situation, the rotational speeds of the first and second motors may be adjusted as with the aforementioned operating efficiency mode.

For example, after the temperature of the object to be cooled has become equal to or lower than the given reference temperature, the rotational speed of one of the first and second motors is decreased by a given rate of change in rotational speed smaller than the rate of change used in a given cooling mode until the temperature of the object to be cooled is raised or becomes higher than the given reference temperature. The rotational speed of the one motor immediately before the temperature of the object to be cooled is raised or becomes higher than the given reference temperature is defined as a steady rotational speed of the one motor for a period during which the temperature of the object to be cooled is equal to or lower than the given reference temperature. Then, the rotational speed of the other motor is decreased by the given rate of change in rotational speed smaller than the rate of change used in the given cooling mode until the temperature of the object to be cooled is raised or becomes higher than the given reference temperature. The rotational speed of the other motor immediately before the temperature of the object to be cooled is raised or becomes higher than the given reference temperature is defined as a steady rotational speed of the other motor for a period during which the temperature of the object to be cooled is equal to or lower than the given reference temperature. In this mode, the ratio of rotational speeds between the first and second motors that have already been determined may slightly be changed, thereby operating the counter-rotating axial-flow fan with higher operating efficiency. Particularly, if one of the first and second motors that gives larger effects to the improvement of cooling performance is used as the one motor, the counter-rotating axial-flow fan may be operated with furthermore higher operating efficiency.

It is not always necessary to change the rotational speeds of the first and second motors for performing the aforementioned adjustments. For example, the rotational speed of one of the first and second motors is decreased by a given rate of change in rotational speed smaller than the rate of change used in the given cooling mode until the temperature of the object to be cooled is raised or becomes higher than the given reference temperature. The rotational speed of the one motor immediately before the temperature of the object to be cooled is raised or becomes higher than the given reference temperature is defined as a steady rotational speed of the one motor for a period during which the temperature of the object to be cooled is equal to or lower than the given reference temperature.

In one or more embodiments of the present invention, an alarm may be issued if the rotational speeds of the first and second motors reach respective predetermined maximum rotational speeds. This may warn the user that the counter-rotating axial-flow fan is out of control.

An alarm may be issued if one of the first and second motors stops rotating, and the rotational speed of the other motor may be increased to a maximum rotational speed thereof. With this, the counter-rotating axial-flow fan will be operated as long as possible until the user who have heard the alarm adopts appropriate measures, thereby playing a maximum role as a cooling apparatus.

DESCRIPTION OF EMBODIMENTS

Figure 1:
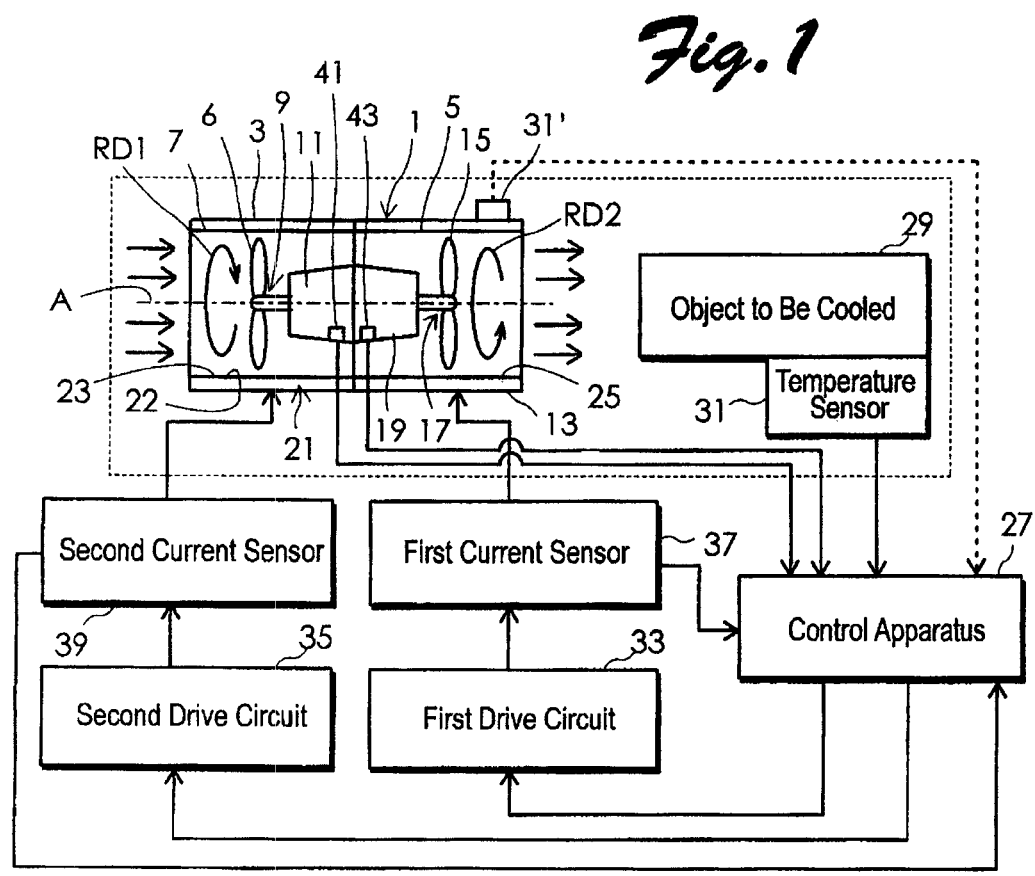
FIG. 1 schematically illustrates a configuration of a control system for a counter-rotating axial-flow fan to which a method of controlling a counter-rotating axial-flow fan of the present invention is applied.

Now, embodiments of the present invention will be described in detail with reference to accompanying drawings. FIG. 1 schematically illustrates a configuration of a control system for a counter-rotating axial-flow fan to which a method of controlling a counter-rotating axial-flow fan of the present invention is applied. In FIG. 1, a counter-rotating axial-flow fan is schematically illustrated. In one or more embodiments of the present invention, a counter-rotating axial-flow fan 1 of the present invention may comprise a first axial-flow fan unit 3 located upstream and a second axial-flow fan unit 5 located downstream. The first and second axial-flow fan units are coupled via a coupling structure. The fans located upstream and downstream may integrally be configured. The first axial-flow fan unit 3 comprises a first casing 7, a first impeller or a forward impeller 9 including a plurality of first blades 6 that is disposed in the first casing 7, and a first motor 11 for driving the first impeller 9. The second axial-flow fan unit 5 comprises a second casing 13, a second impeller or a rearward impeller 17 including a plurality of second blades 15 that is disposed in the second casing 13, and a second motor 19 for driving the second impeller 17. In this configuration, the first casing 7 and second casing 13 are combined to form a housing 21. The housing 21 includes an air channel 22 having a suction port 23 on one end thereof and a discharge port 25 on the other end thereof. The first motor 11 for rotating the first impeller 9 around an axial line A rotates counter to the second motor 19 for rotating the second impeller 17 around the axial line A. The direction of rotation RD1 of the first impeller 9 is opposite to the direction of rotation RD2 of the second impeller 17.

According to the present invention, the rotational speed of the first motor 11 and that of the second motor 19 of the counter-rotating axial-flow fan 1 are controlled using a control command from a control apparatus 27 such that the temperature T of an object to be cooled 29 including a heat-emitting electronic component such as a CPU may be equal to or lower than a given reference temperature Tr. A temperature sensor 31 such as a thermistor is disposed directly at or in the vicinity of the object to be cooled 29 in order to measure the temperature T of the object to be cooled 29. The temperature sensor 31 inputs a signal indicative of the detected temperature to the control apparatus 27. Then, the control apparatus 27 gives control or drive commands to first and second drive circuits 33 and 35 in order to drive the first and second motors 11 and 19. The drive circuits 33 and 35 supply excitation current to excitation windings of the respective motors. First and second current sensors 37 and 39 are respectively disposed between the first drive circuit 33 and the excitation windings of the first motor 11 and between the second drive circuit 35 and the excitation windings of the second motor 19. Outputs from the first and second current sensors 37 and are inputted to the control apparatus 27. In this embodiment, Hall devices 41 and 43 are respectively disposed inside the first and second motors as means for detecting the rotational speeds of the first and second motors 11 and 19. The Hall devices 41 and 43 detect magnetic flux from permanent magnets of magnet rotors. Outputs from the Hall devices 41 and 43 are processed in the control apparatus 27, thereby detecting the rotational speeds of the first and second motors.

The control apparatus 27 includes a microcomputer that executes a given control program, and outputs control commands to the first and second drive circuits 33 and 35. An example control program is configured to implement the method of the present invention. Basically, the control program controls the rotational speeds, N1 and N2, of the first and second motors 11 and 19 of the counter-rotating axial-flow fan 1 using a starting mode, a cooling efficiency mode, and an operating efficiency mode.

Figure 2:
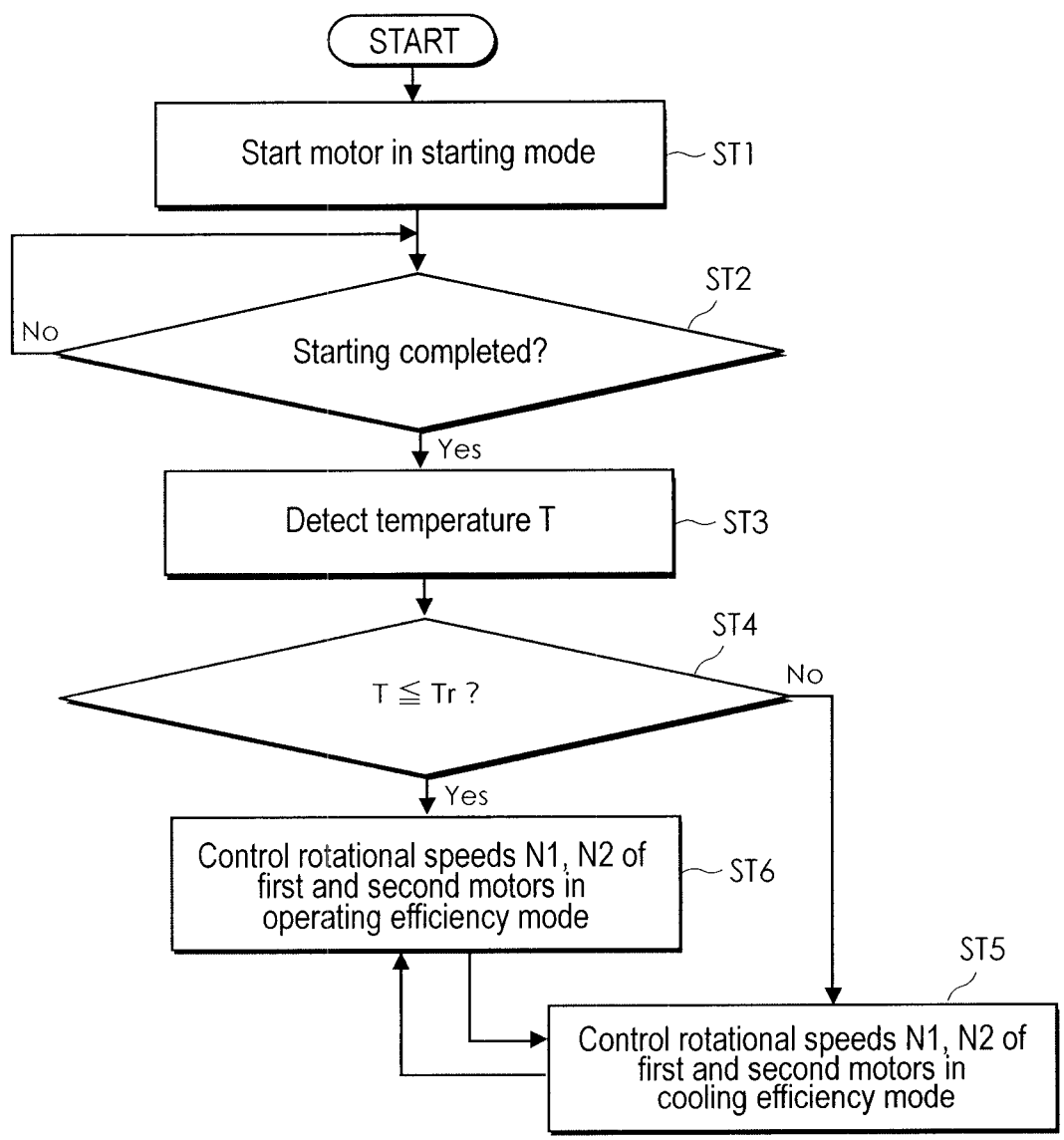
FIG. 2 is a flowchart showing a basic algorithm of a control program to be installed in a microcomputer disposed in a control apparatus in which the method of the present invention is implemented.

FIG. 2 is a flowchart showing a basic algorithm of a control program to be installed in a microcomputer disposed in the control apparatus 27 in which the method of the present invention is implemented. Referring to the algorithm, the motors are started according to the staring mode in step ST1. Examples of the starting mode will be described later. Once it is detected that the motors have been started in step ST2, the temperature T of the object to be cooled 29 is measured by the temperature sensor 31 in step ST3. Then, it is determined in step ST4 whether or not the measured temperature T is higher than a given reference temperature Tr that has been predetermined appropriately according to the characteristics of the object to be cooled 29. For example, if the object to be cooled 29 is a CPU emitting a large amount of heat, the reference temperature Tr may be an upper limit temperature at which the CPU is operable. The reference temperature Tr may be determined according to the characteristics of the object to be cooled 29. If the measured temperature T is higher than the given reference temperature TR (T>Tr), the program proceeds to step ST5 where the rotational speeds N1 and N2 of the first and second motors 11 and 19 are controlled according to a predetermined cooling efficiency mode that gives priority to cooling the object to be cooled 29 over the operating efficiency or reduced power consumption of the counter-rotating axial-flow fan 1. If the temperature T of the object to be cooled 29 is equal to or lower than the given reference temperature Tr (T≤Tr), the program proceeds to step ST6 where the rotational speeds N1 and N2 of the first and second motors 11 and 19 are controlled according to a predetermined operating efficiency mode that maintains the temperature T of object to be cooled 29 equal to or lower than the given reference temperature Tr and reduces the power consumption of the counter-rotating axial-flow fan 1, thereby increasing the operating efficiency. In this algorithm, since a function of determining the temperature is implemented in steps ST5 and ST6 as well as step ST4, the program may go back and forth between steps ST5 and ST6.

According to this algorithm, if the temperature T of the object to be cooled 29 is high, the rotational speeds N1 and N2 of the first and second motors 11 and 19 are controlled according to the predetermined cooling efficiency mode that gives priority to cooling the object to be cooled 29 over the operating efficiency or reduced power consumption of the counter-rotating axial-flow fan 1. As a result, the object to be cooled 29 may quickly be cooled down to or below the given reference temperature Tr. Once the object to be cooled 29 has been cooled down to or below the given reference temperature Tr, the rational speeds N1 and N2 of the first and second motors 11 and 19 are controlled according to the predetermined operating efficiency mode that is configured to reduce the power consumption of the counter-rotating axial-flow fan 1. Thus, the power consumption may be reduced after cooling down the object to be cooled 29, thereby enabling efficient operation of the fan.

Figure 3:
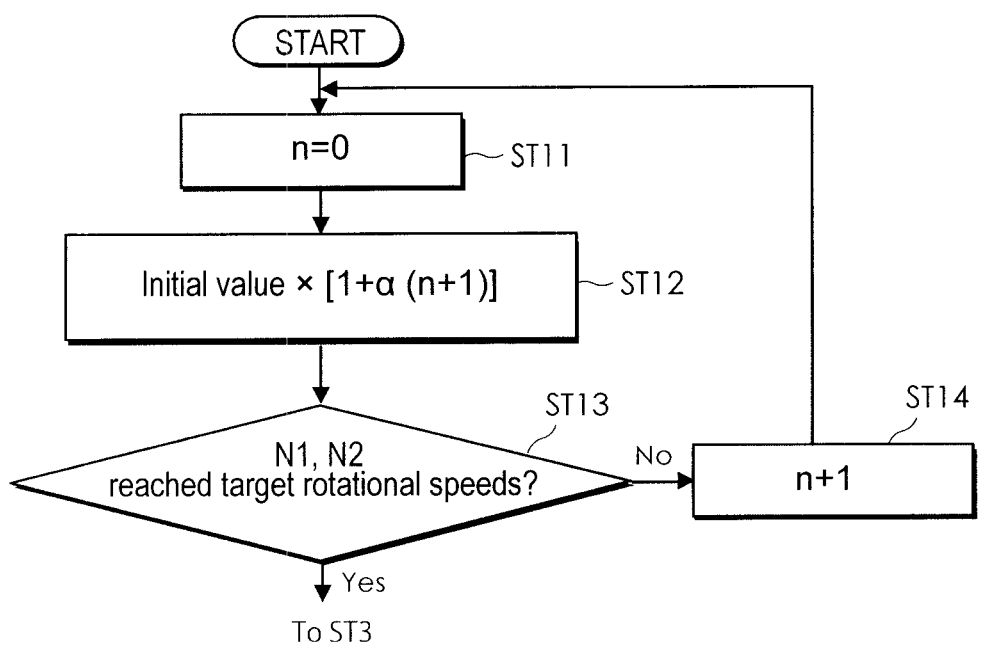
FIG. 3 is a flowchart showing an algorithm of an example starting mode to be implemented in steps ST1 and ST2 of FIG. 1.

The first and second motors 11 and 19 may be started in different starting modes and the starting mode to start the motors may arbitrarily be chosen. FIG. 3 is a flowchart showing an algorithm of an example starting mode to be implemented in steps ST1 and ST2 of FIG. 1. Referring to the flowchart of FIG. 3, the ratio of rotational speeds, N1:N2, between the first and second motors 11 and 19 is constantly maintained and the rotational speeds N1 and N2 of the first and second motors 11 and 19 are stepwisely increased up to respective target rotational speeds. In step ST11, n is set to 0 or zero. In step ST12, an expression of Initial Value×[1+α(n+1)] is computed where "Initial Value" is an initial value for each of the rotational speeds N1 and N2, and α is a real number indicating an amount of change in rotational speed. If α is increased, the rotational speeds will be sharply increased. If α is decreased, the rotational speeds will gradually be increased, thereby moderately starting the motors. In step ST12, the rotational speeds N1 and N2 of the first and second motors 11 and 19 are increased from the respective initial values by a constant amount of change in rotational speed as determined by α. In step ST13, it is determined whether or not the rotational speeds N1 and N2 of the first and second motors 11 and 19 have reached the respective target rotational speeds. The program repeatedly goes to step ST14 to accelerate the rotational speeds until the respective target rotational speeds are reached. Once the target rotational speeds have been reached, the program proceeds to step ST3 in FIG. 2.

Figure 4:
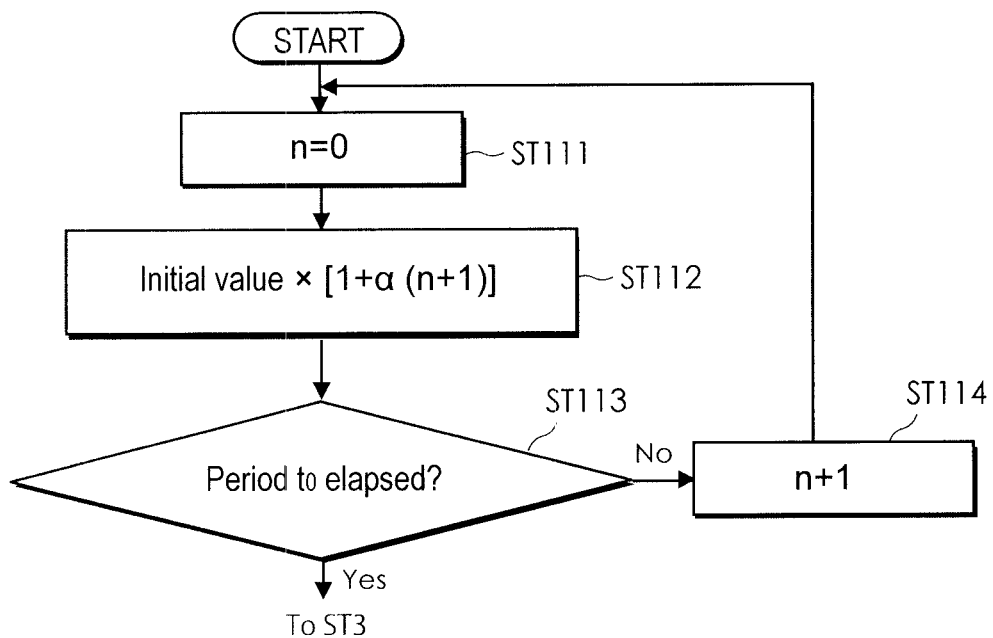
FIG. 4 is a flowchart showing an algorithm of another example starting mode.

FIG. 4 is a flowchart showing an algorithm of another example starting mode. Referring to the algorithm of the starting mode illustrated in FIG. 4, it is determined in step ST113 whether or not a period of time $t_0$ elapses since the starting operation has been initiated, and the first and second motors 11 and 19 are accelerated for the period of time $t_0$. This is different from the starting mode illustrated in FIG. 3. Other steps in FIG. 4 are substantially the same as the corresponding steps in FIG. 3. The steps in FIG. 4 are allocated reference numerals obtained by adding 100 to reference numerals of the corresponding steps in FIG. 3 and descriptions thereof are omitted.

Figure 5:
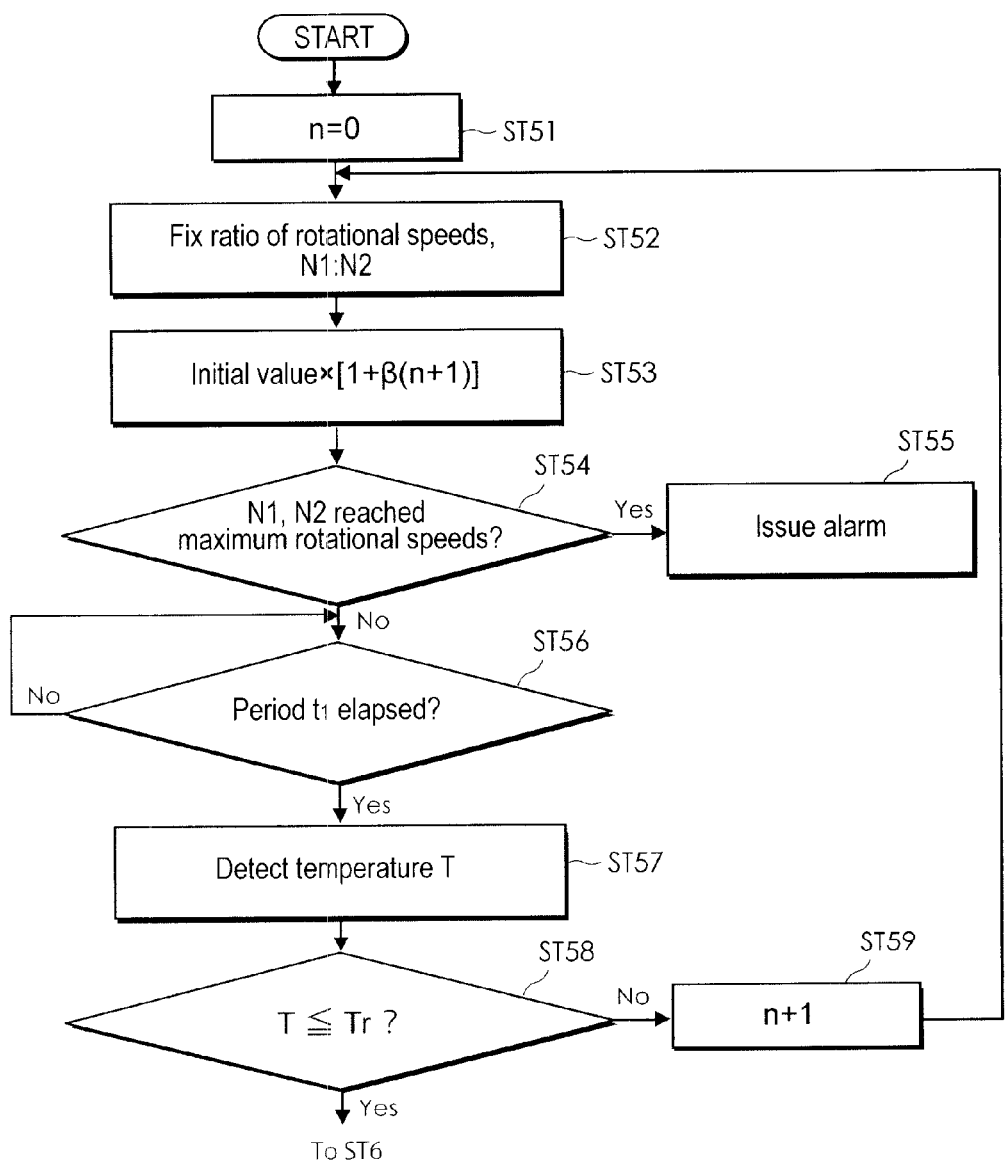
FIG. 5 is a flowchart showing a detailed algorithm of an example cooling efficiency mode to be implemented in step ST5 of FIG. 2.

The cooling efficiency mode may arbitrarily be configured, provided that the mode gives priority to cooling the object to be cooled 29 over the operating efficiency of the counter-rotating axial-flow fan 1. FIG. 5 is a flowchart showing a detailed algorithm of an example cooling efficiency mode to be implemented in step ST5 of FIG. 2. Referring to the algorithm, the ratio of rotational speeds, N1:N2, between the first and second motors 11 and 19 that have been determined in the starting mode is fixed in step ST52. Then, the rotational speeds N1 and N2 of the first and second motors 11 and 19 are stepwisely increased. In step ST51, n is set to 0 or zero. In step 53, an expression of Initial Value x $[1+\beta(n+1)]$ is computed where "Initial Value" is an initial value for each of the rotational speeds N1 and N2 at the time that the starting mode is completed, and $\beta$ is a real number of $1>\beta>0$ indicating a rate of change in rotational speed. If the rate of change $\beta$ is increased, the rotational speed will sharply be increased, which accordingly increases the cooling speed. If the rate of change $\beta$ is decreased, the rotational speed will gradually be increased, which accordingly decreases the cooling speed. The value of $\beta$ should appropriately be determined according to how much heat is emitted by the object to be cooled 29. In step ST54, it is determined whether or not the rotational speeds N1 and N2 of the first and second motors 11 and 19 have reached respective maximum rotational speeds thereof. If the rotational speeds N1 and N2 of the first and second motors 11 and 19 have reached the respective maximum rotational speeds, cooling performance cannot be increased any more. As a result, the object to be cooled 29 will be overheated. Then, an alarm is issued in step ST55 if the respective maximum rotational speeds have been reached in step ST54. If the respective maximum rotational speeds have not been reached yet, or there is some room for increasing the rotational speeds in step ST54, the program proceeds to step ST56 to wait until a period of time $t_1$ elapses. After the period of time $t_1$ has elapsed, the temperature T of the object to be cooled 29 is measured while the motors are rotating at the respective rotational speeds of that moment in step ST57. Then, it is determined in step ST58 whether or not the temperature T of the object to be cooled 29 measured in step ST57 is equal to or lower than the given reference temperature Tr. If "No", namely, the temperature T of the object to be cooled 29 is higher than the reference temperature Tr, the program goes to step ST59 where n is incremented by 1 or one and then goes back to step ST52. If "Yes", namely, the temperature T of the object to be cooled 29 is equal to or lower than the reference temperature Tr, the program proceeds to step ST6 in FIG. 2.

Figure 6:
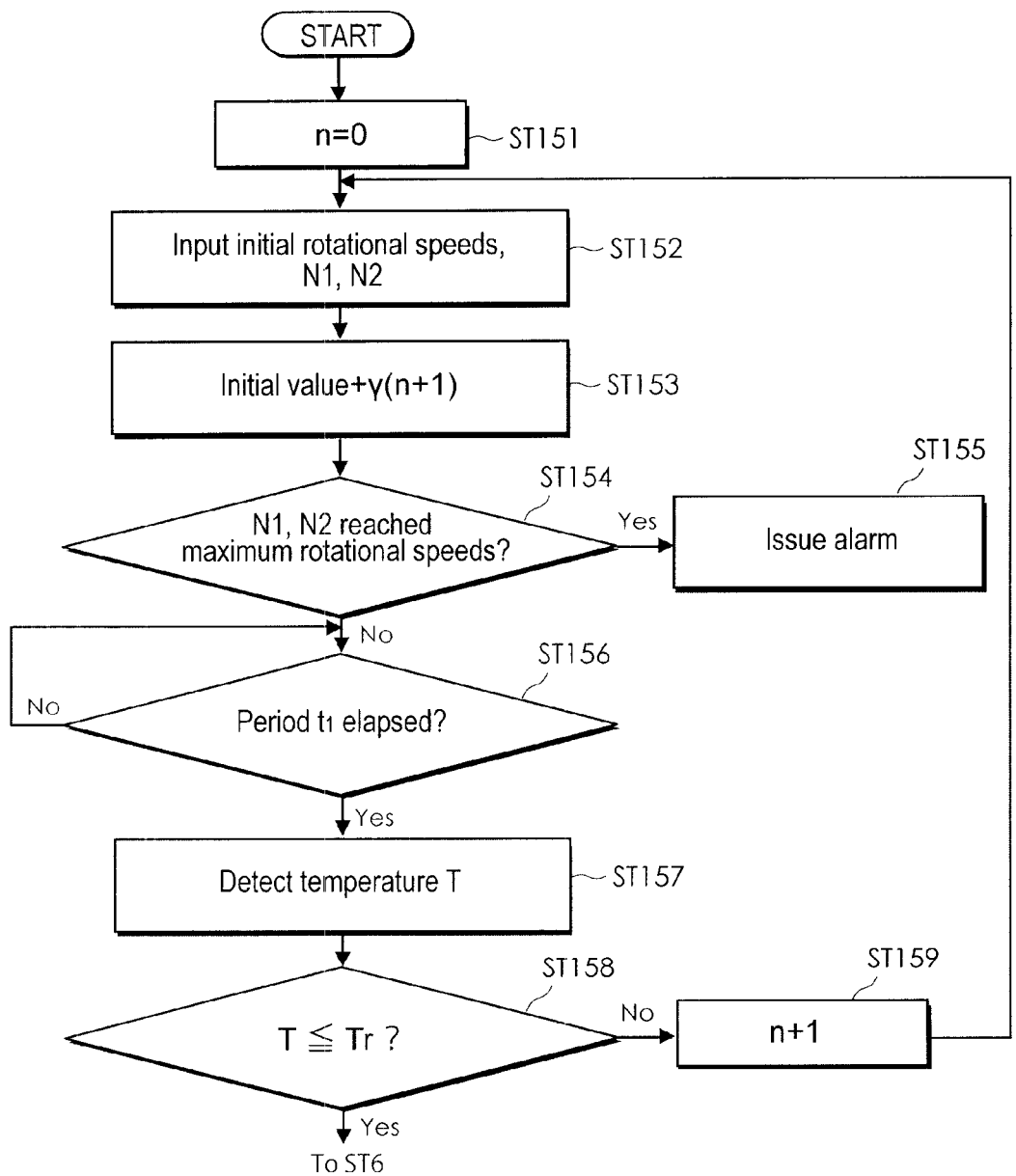
FIG. 6 is a flowchart showing a detailed algorithm of another example cooling efficiency mode to be implemented in step ST5 of FIG. 2.

FIG. 6 is a flowchart showing a detailed algorithm of another example cooling efficiency mode to be implemented in step ST5 of FIG. 2. Referring to the algorithm, the rotational speeds N1 and N2 of the first and second motors 11 and 19, which have been set in the starting mode, are set as respective initial rotational speeds thereof. Then, the rotational speeds N1 and N2 of the first and second motors 11 and 19 are controlled by changing the rotational speeds. In step ST151, n is set to 0 or zero. In step ST152, the rotational speeds N1 and N2 of the first and second motors 11 and 19 are set as respective initial rotational speeds thereof. In step ST153, an expression of Initial Value x $[1+\gamma(n+1)]$ is computed where "Initial Value" is the rotational speeds N1 and N2 of the first and second motors 11 and 19 at the time that the starting mode is completed, and $\gamma$ denotes an amount of change or an increase in rotational speed. If the amount of change $\gamma$ is increased, the rotational speed will rapidly be increased, thereby increasing the cooling speed. If the amount of change $\gamma$ is decreased, the rotational speed will gradually be increased, thereby decreasing the cooling speed. The value of $\gamma$ should appropriately be determined according to how much heat is emitted by the object to be cooled 29. In controlling the rotational speeds in this manner, the ratio of rotational speeds, N1:N2, between the first and second motors 11 and 19 is varied or changed, which results in controlling the rotational speeds N1 and N2. Other steps in FIG. 6 are substantially the same as the corresponding steps in FIG. 5. The steps in FIG. 6 are allocated reference numerals obtained by adding 100 to reference numerals of the corresponding steps in FIG. 5 and descriptions thereof are omitted.

Figure 7:
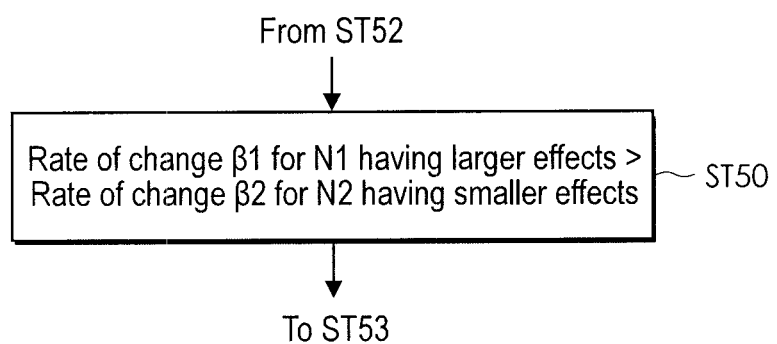
FIG. 7 is a flowchart showing an algorithm of the cooling efficiency mode of FIG. 5 wherein the rotational speed of at least one of the motors is changed.

In order to change the ratio of rotational speeds, N1:N2, between the first and second motors 11 and 19, at least one of the rotational speeds N1 and N2 may be changed. Preferably, the rate of change $\beta 1$ for one of the first and second motors 11 and 19 that gives larger effects to the improvement of cooling performance when rotated may be larger than the rate of change $\beta 2$ for the other motor, as shown in step ST50 in FIG. 7. In the counter-rotating axial-flow fan 1 according to the present invention, the first motor 11 for rotating the first impeller 9 located in the vicinity of the suction port 23 is the one motor, and the second motor 19 is the other motor.

Figure 8:
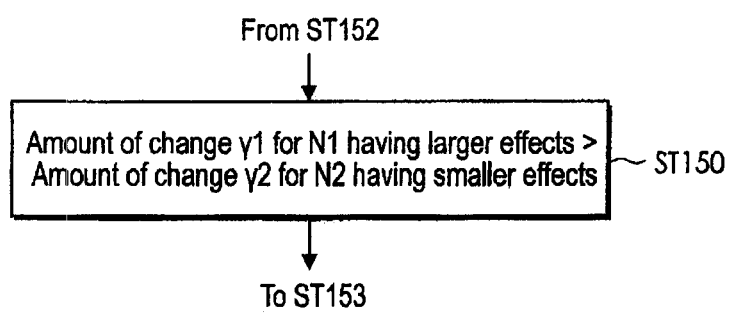
FIG. 8 is a flowchart showing an algorithm of the cooling efficiency mode of FIG. 6 wherein the rotational speed of at least one of the motors is changed.

The first and second motors may be controlled stepwisely as described above, or may be controlled by continuously changing the rotational speeds. Here, the amount of change may be substituted for the rate of change shown in FIG. 7. Preferably, the amount of change $\gamma 1$ for one of the first and second motors 11 and 19 that gives larger effects to the improvement of cooling performance when rotated may be larger than the amount of change $\gamma 2$ for the other motor, as shown in step ST150 in FIG. 8.

The operating efficiency mode to be implemented in step ST6 according to the present invention may arbitrarily be configured, provided that the power consumption can be reduced more than in the cooling efficiency mode in step ST5 and that the temperature T of the object to be cooled 29 may not exceed the given reference temperature Tr.

Figure 9:
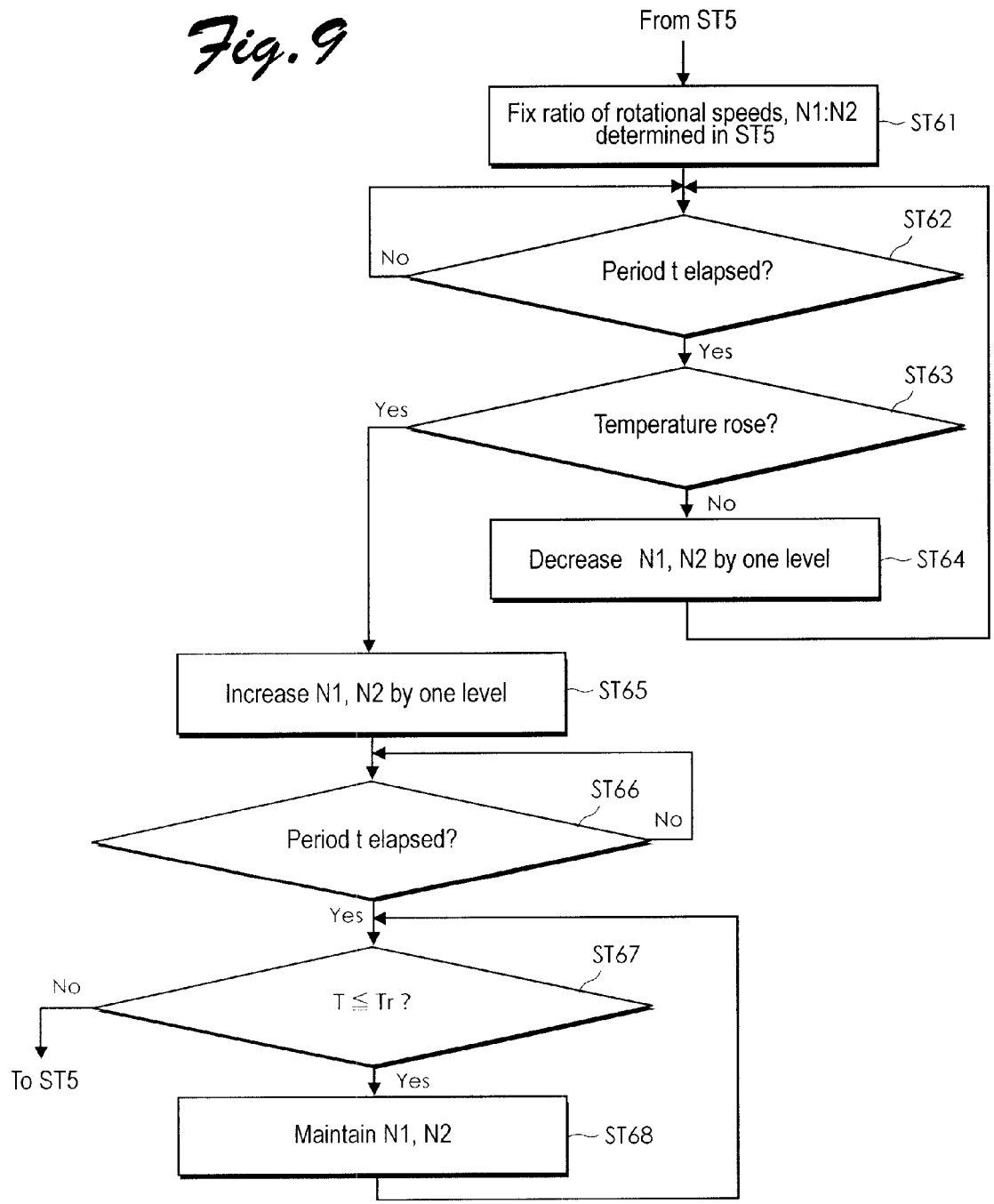
FIG. 9 is a flowchart showing an algorithm of an example operating efficiency mode to be implemented in step ST6 of FIG. 2.

FIG. 9 is a flowchart showing an algorithm of an example operating efficiency mode to be implemented in step ST6 of FIG. 2. Referring to the algorithm in this example operating efficiency mode, the ratio of rotational speeds, N1:N2, between the first and second motors 11 and 19 is fixed in step ST61, the rotational speeds N1 and N2 having been determined in step ST5. Then, it is determined in step ST62 whether or not a given period of time t has elapsed. The period of time t may arbitrarily be determined, provided that effects obtained by changing the rotational speeds may be confirmed during that period of time. The period of time t should not be lengthened more than necessary. Next in step ST63, the temperature T of the object to be cooled 29 is measured by the temperature sensor 31 and it is determined whether or not the measure temperature T is raised. If not, the program proceeds to step ST64 where the rotational speeds N1 and N2 of the first and second motors 11 and 19 are decreased by one level. One level is computed using a similar expression to the one used in step ST53 in FIG. 5, specifically, an expression of Initial Value x $[1+\eta(n+1)]$ where $\eta$ is a negative rate of change and n is incremented by 1 or one to decrease the rotational speeds. Therefore, in step ST64, the temperature is lowered while the ratio of rotational speeds N1 and N2 is maintained unchanged. The rate of change $\eta$ used in the operating efficiency mode is smaller than the rate of change $\beta$ used in the cooling efficiency mode. In other words, the amount of change in rotational speed for decreasing the rotational speeds is defined to be smaller than that for increasing the rotational speeds. Thus, the operating efficiency may accurately be increased by delicate control of the rotational speeds. A decrease in rotational speed by one level means lowered cooling performance or reduced power consumption of the motors. If it is determined in step ST63 that the rotational speeds have been decreased to an allowable limit that the temperature is raised, it means that the power consumption has been minimized or the operating efficiency has been maximized. The rotational speeds are repeatedly decreased in steps ST 62 through ST64. Once it is determined in step ST63 that the temperature has been raised, the program proceeds to step ST65 where the rotational speeds N1 and N2 of the first and second motors 11 and 19 are increased by one level. In other words, the rotational speeds are restored to the immediately previous speeds. In step ST66, it is determined whether or not the period t has elapsed. In step ST 67, it is determined whether or not the measured temperature T is equal to or lower than the reference temperature Tr. If the measured temperature Tr is equal to or lower than the reference temperature Tr in step ST67, the program proceeds to step ST 68 where the rotational speeds N1 and N2 are maintained unchanged. The rotational speeds N1 and N2 of the first and second motors 11 and 19 immediately before the temperature T of the object to be cooled 29 is raised is defined as respective steady rotational speeds for a period during which the temperature T of the object to be cooled 29 is equal to or lower than the reference temperature Tr. If the measured temperature T is higher than the reference temperature Tr in step ST67, the program goes back to step ST 5 to enter the cooling efficiency mode again, determining that ventilating conditions have changed. Also, if it is determined in step ST67 that the measure temperature T is higher than the reference temperature Tr while the rotational speeds N1 and N2 are maintained unchanged in step ST68, the program goes back to step ST 5 to enter the cooling efficiency mode again, determining that ventilating conditions have changed.

Figure 10:
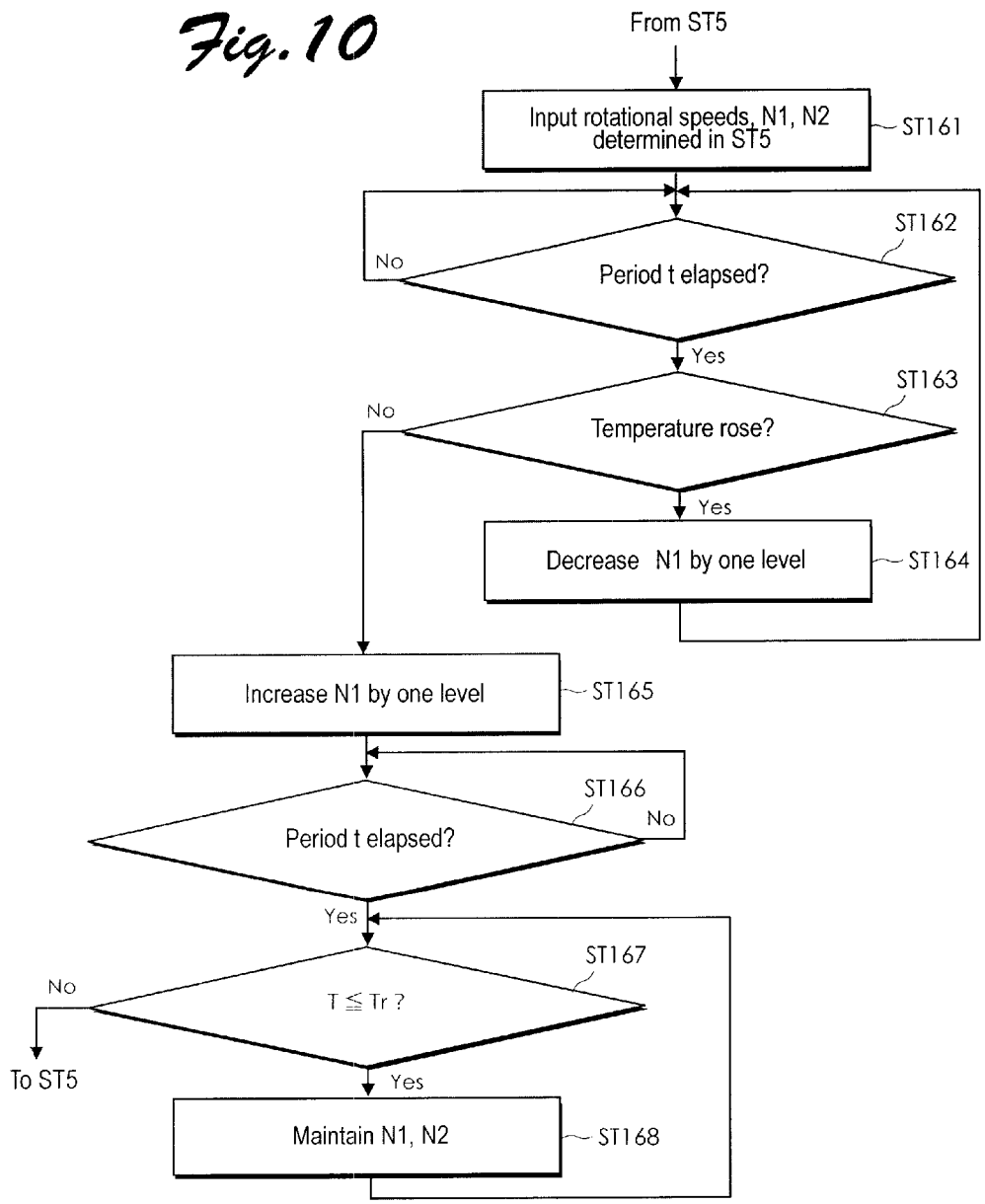
FIG. 10 is a flowchart showing an algorithm of the operating efficiency mode wherein the rotational speed of only the first motor is changed to determine a ratio of rotational speeds required for obtaining the maximum operating efficiency.
Figure 11:
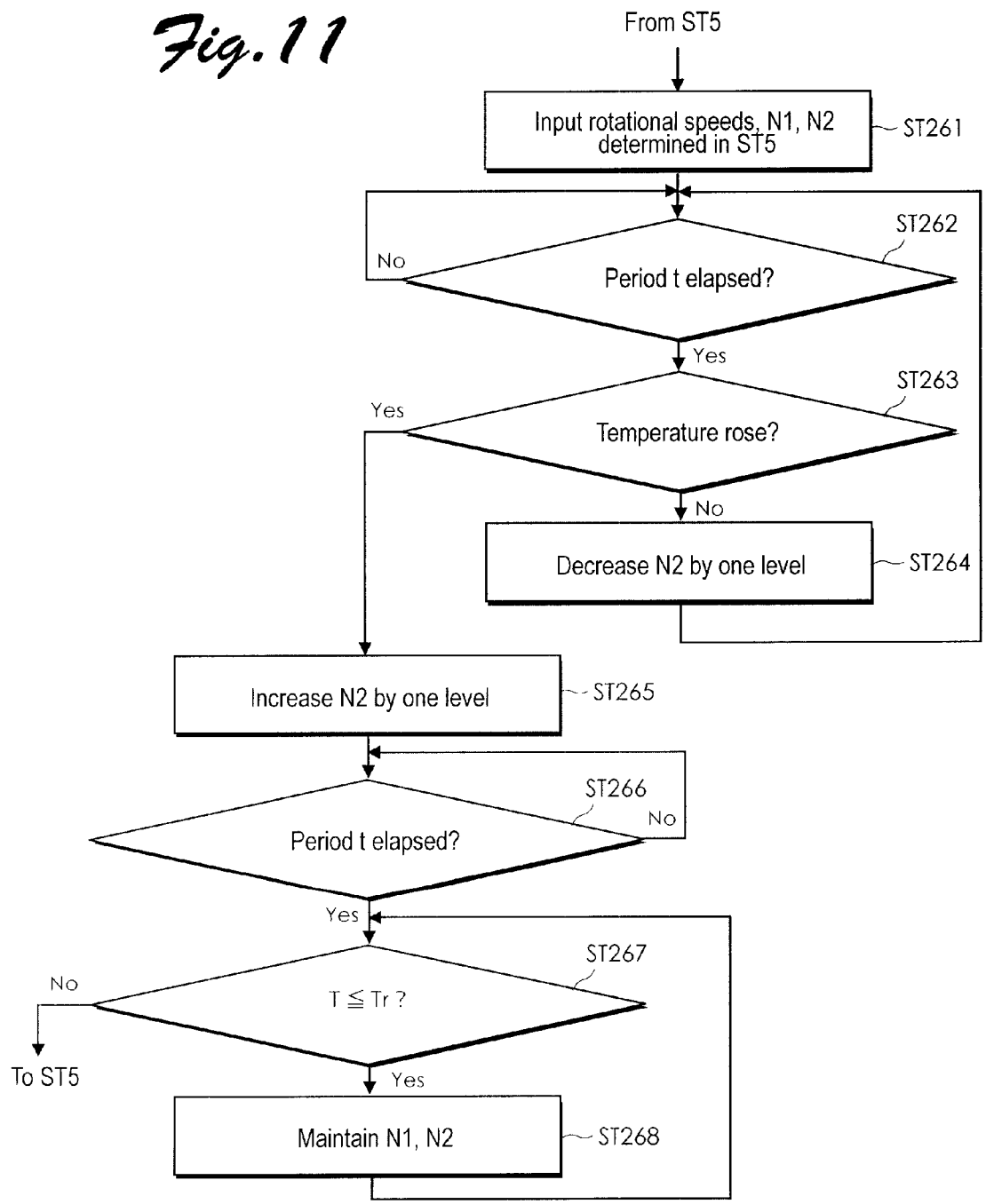
FIG. 11 is a flowchart showing an algorithm of the operating efficiency mode wherein the rotational speed of only the second motor is changed to determine a ratio of rotational speeds required for obtaining the maximum operating efficiency.

If the aforementioned operating efficiency mode is employed and the ratio of rotational speeds, N1:N2, between the first and second motors 11 and 19 should be changed, one of the rotational speed N1 of the first motor 11 and the rotational speed N2 of the second motor 19, which have finally been set in the cooling efficiency mode, may stepwisely be decreased to change the ratio of rotational speeds N1:N2. FIG. 10 is a flowchart showing an algorithm of the operating efficiency mode wherein only the rotational speed N1 of the first motor 11 is changed to determine a ratio of rotational speeds required for obtaining the maximum operating efficiency. FIG. 11 is a flowchart showing an algorithm of the operating efficiency mode wherein only the rotational speed N2 of the second motor 19 is changed to determine a ratio of rotational speeds required for obtaining the maximum operating efficiency. Referring to the algorithm in FIG. 10, the steps in FIG. 10 are allocated reference numerals obtained by adding 100 to reference numerals of the corresponding steps in FIG. 9. Referring to the algorithm in FIG. 11, the steps in FIG. 11 are allocated reference numerals obtained by adding 200 to reference numerals of the corresponding steps in FIG. 9. The algorithm illustrated in FIG. 10 is different from that illustrated in FIG. 9 in that the ratio of rotational speeds, N1:N2, between the first and second motors 11 and 19 is not fixed in step ST161, the rotational speed N1 of the first motor 11 and the rotational speed N2 of the second motor 19 having been determined in step ST5. Also, the algorithm illustrated in FIG. 11 is different from that illustrated in FIG. 9 in that the ratio of rotational speeds, N1:N2, between the first and second motors 11 and 19 is not fixed in step ST261, the rotational speed N1 of the first motor 11 and the rotational speed N2 of the second Motor 19 having been determined in step ST5.

Figure 12:
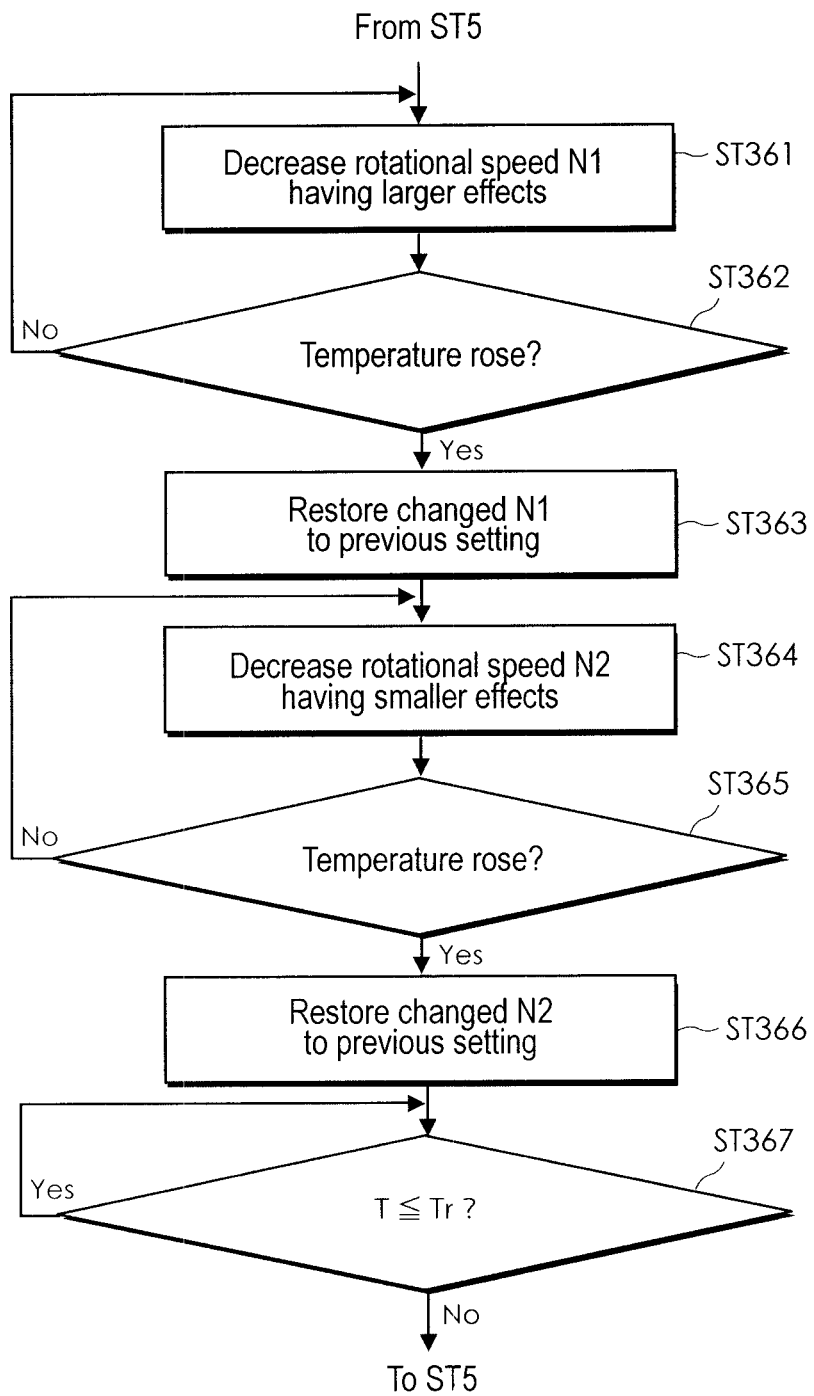
FIG. 12 is a flowchart showing an algorithm of another example operating efficiency mode.

FIG. 12 is a flowchart showing an algorithm of another example operating efficiency mode. In this operating efficiency mode, the rotational speed N1 of the first motor 11, which gives large effects to the improvement of cooling performance, is primarily controlled. In this operating efficiency mode, in step ST361, the rotational speed N1 of the first motor 11 that gives larger effects to the improvement of cooling performance than the second motor 19 when rotated is first decreased by a given rate of change η smaller than a change of rate β used in the cooling efficiency mode until the temperature T of the object to be cooled 29 is raised. In steps ST362 and ST363, the rotational speed N1 of the first motor 11 immediately before the temperature T of the object to be cooled 29 is raised is defined as a steady rotational speed of the first motor 11 for a period during which the temperature T of the object to be cooled 29 is equal to or lower than the given reference temperature Tr. Then in step ST364, the rotational speed N2 of the second motor 19 that gives smaller effect to the improvement of cooling performance than the first motor 11 is subsequently decreased by the given rate of change η smaller than the rate of change β used in cooling efficiency mode.

Then in steps ST365 and 366, the rotational speed N2 of the second motor 19 immediately before the temperature T of the object to be cooled 29 is raised is defined as a steady rotational speed of the second motor 19 for a period during which the temperature T of the object to be cooled 29 is equal to or lower than the given reference temperature Tr. After the rotational speeds N1 and N2 of the first and second motors 11 and 19 have been determined for improved operating efficiency, the temperature T of the object to be cooled 29 is observed in step ST367. If the temperature T exceeds the reference temperature Tr, the program goes back to step ST5 in FIG. 2. Then, the rotational speeds will appropriately be determined again according to the cooling efficiency mode and the operating efficiency mode.

Figure 13:
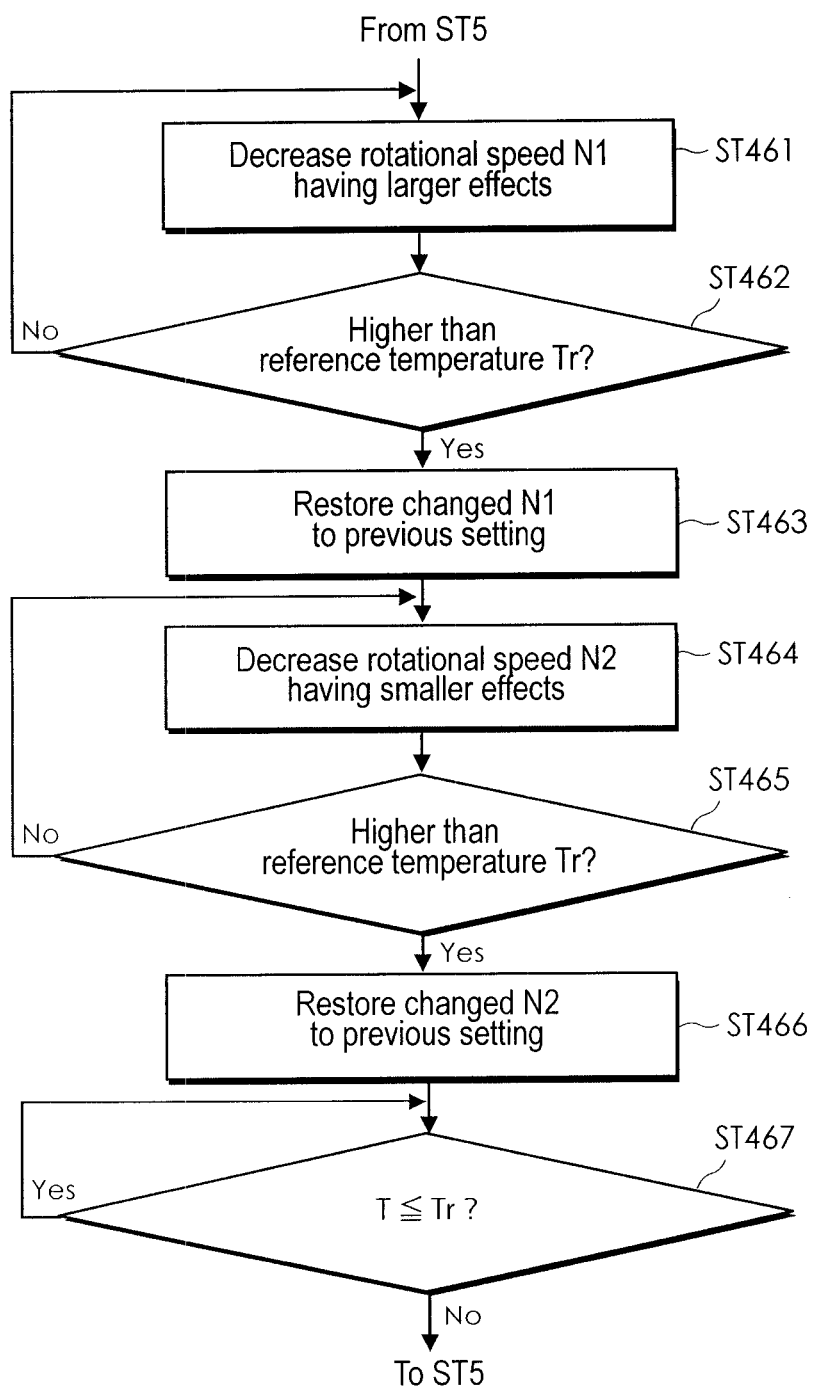
FIG. 13 is a flowchart showing an algorithm of still another example operating efficiency mode.

An operating efficiency mode illustrated in FIG. 13 may be substituted for the operating efficiency mode illustrated in FIG. 12. In the operating efficiency mode illustrated in FIG. 13, in step ST461, the rotational speed N1 of the first motor 11 that gives larger effects to the improvement of cooling performance than the second motor 19 when rotated is decreased by a given rate of change q smaller than the change of rate 13 used in the cooling efficiency mode until the temperature T of the object to be cooled 29 becomes higher than the given reference temperature Tr. Then in steps ST462 and ST463 the rotational speed N1 of the first motor 11 immediately before the temperature T of the object to be cooled 29 becomes higher than the given reference temperature Tr is defined as a steady rotational speed of the first motor 11 for a period during which the temperature T of the object to be cooled 29 is equal to or lower than the given reference temperature Tr. Then in steps ST465 and 466, the rotational speed N2 of the second motor 19 immediately before the temperature T of the object to be cooled 29 becomes higher than the given reference temperature Tr is defined as a steady rotational speed of the second motor 19 for a period during which the temperature T of the object to be cooled 29 is equal to or lower than the given reference temperature Tr. Other steps in FIG. 13 are allocated reference numerals obtained by adding 100 to reference numerals of the corresponding steps in FIG. 12, and descriptions thereof are omitted.

The amount of change δ in rotational speed may be changed instead of the rate of change η in rotational speed.

Out of the first and second motors 11 and 19, the rotational speed N2 of the second motor 19 may be decreased by an amount of change δ smaller than an amount of change γ used in the cooling efficiency mode until the temperature T of the object to be cooled 29 is raised.

Thus, in the operating efficiency modes illustrated in FIGS. 12 and 13, the rotational speed of one motor that gives larger effects to the improvement of cooling performance than the other motor is first decreased, thereby shortening the time required to determine appropriate rotational speeds of the motors. The rotational speed of the other motor that has smaller effects is subsequently decreased, thereby enabling delicate adjustments of the rotational speeds and increasing the accuracy of determining the rotational speeds.

Figure 14:
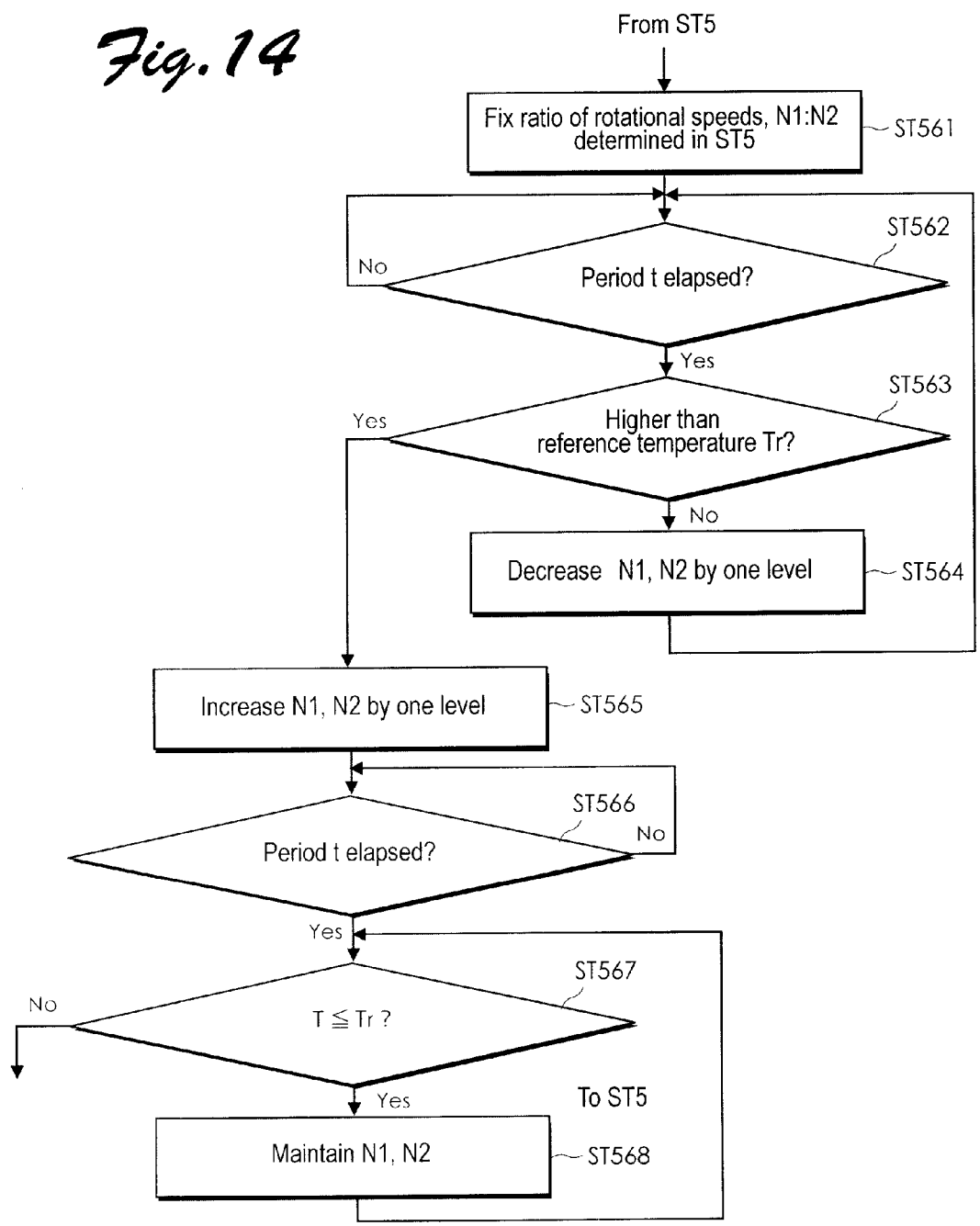
FIG. 14 is a flowchart showing an algorithm of another operating efficiency mode to be implemented in step ST6 of FIG. 2.

As with the operating efficiency mode illustrated in FIG. 13 to be substituted for that illustrated in FIG. 12, the operating efficiency mode illustrated in FIG. 14 may be substituted for that illustrated in FIG. 9. In the operating efficiency mode illustrated in FIG. 14, after a given period of time t has elapsed in step DT562, it is determined in step ST 563 whether or not the temperature T measured by the temperature sensor 31 for measuring the temperature T of the object to be cooled 29 is higher than the given reference temperature Tr. If the temperature T is higher than the given reference temperature Tr, the program proceeds to step ST565. If the measured temperature T is equal to or lower than the given reference temperature Tr in step ST 567, the rotational speeds N1 and N2 at that moment are maintained in step ST 568. In other words, the rotational speeds N1 and N2 of the first and second motors 11 and 19 immediately before the temperature T of the object to be cooled 29 becomes higher than the given reference temperature Tr are defined as respective steady rotational speeds thereof for a period during which the temperature T of the object to be cooled 29 is equal to or lower than the given reference temperature Tr. Other steps in FIG. 14 are substantially the same as the corresponding steps in FIG. 9 and are allocated reference numerals obtained by adding 500 to those of the corresponding steps in FIG. 9 and descriptions thereof are omitted.

As with the operating efficiency mode illustrated in FIG. 14 to be substituted for that illustrated in FIG. 9, though not illustrated, in the operating efficiency modes illustrated in FIGS. 10 and 11, it may be determined in steps ST163 or ST263 whether or not the temperature T measured by the temperature sensor 31 for measuring the temperature T of the object to be cooled 29 becomes higher than the given reference temperature Tr and the rotational speeds N1 and N2 may be maintained. In other words, in steps ST168 and ST268, one of the rotational speeds N1 and N2 of the first and second motors 11 and 19 immediately before the temperature T of the object to be cooled 29 becomes higher than the given reference temperature Tr may be defined as a steady rotational speed for both of the first and second motors 11 and 19 for a period during which the temperature T of the object to be cooled 29 is equal to or lower than the given reference temperature Tr.

Figure 15:
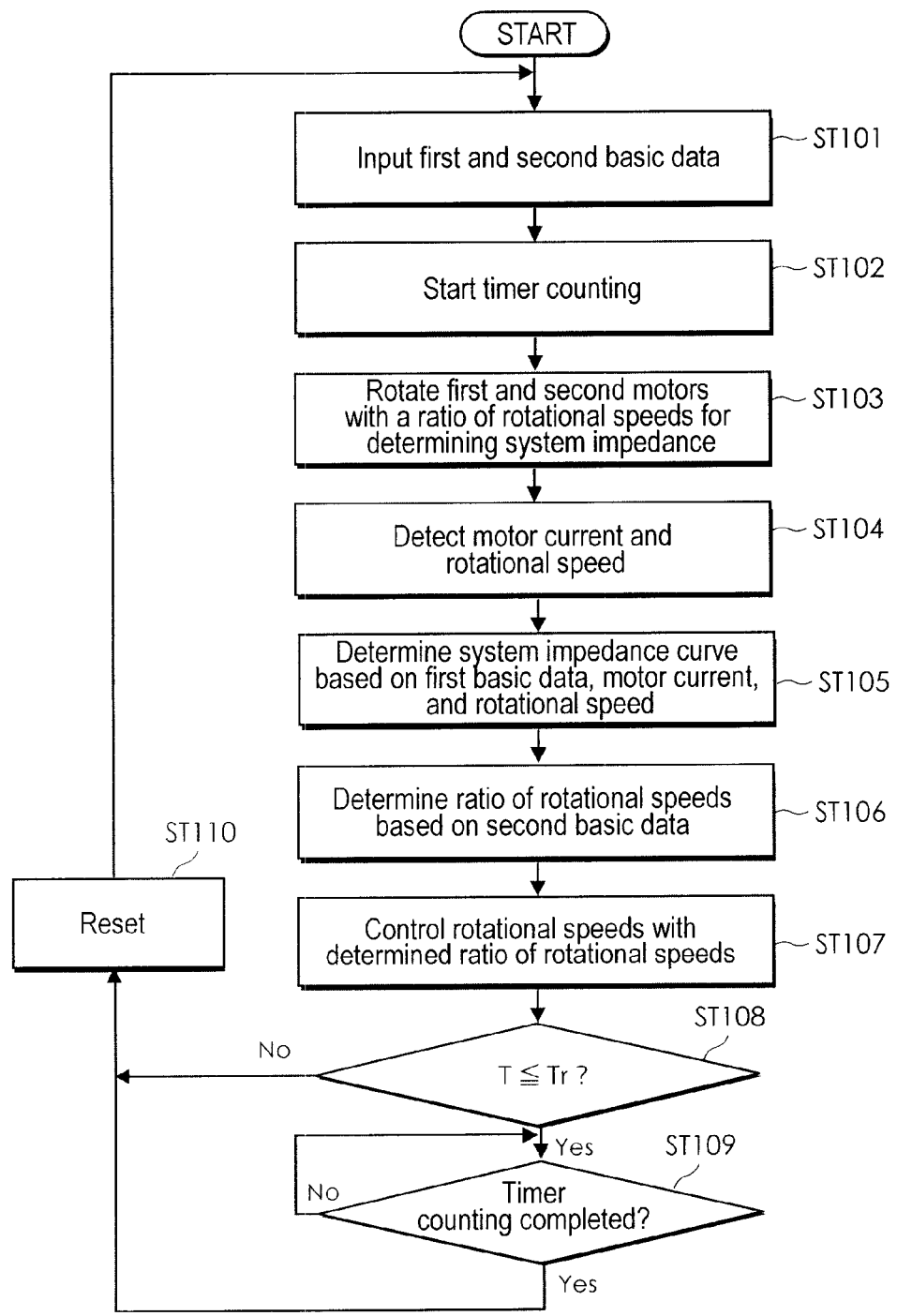
FIG. 15 is a flowchart showing an algorithm of a program to be used to control the rotational speeds of the first and second motors, wherein the ratio of rotational speeds between the first and second motors is determined to increase operating efficiency and such appropriate ratio of rotational speeds is used from the beginning to control the rotational speeds of the first and second motors.

FIG. 15 is a flowchart showing an algorithm of a program to be installed in a microcomputer disposed in the control apparatus 27 to control the rotational speeds N1 and N2 of the first and second motors 11 and 19, wherein the system impedance is used to determine an appropriate ratio of rotational speeds, N1:N2, between the first and second motors 11 and 19 for improving operating efficiency and such appropriate ratio of rotational speeds is used from the beginning to control the rotational speeds N1 and N2 of the first and second motors 11 and 19 such that the temperature T of the object to be cooled 29 may be equal to or lower than the reference temperature Tr.

The first and second current sensors 37 and 39 as well as the Hall devices 41 and 43 for detecting the rotational speeds of the motors, as illustrated in FIG. 1, are used in the control processing using this program.

Specifically, a counter-rotating axial-flow fan 1 for data measurements is prepared and then flow rate-static pressure characteristics are measured with the ratio of rotational speeds, N1:N2, between first and second motors 11 and 19 of the counter-rotating axial-flow fan 1 for data measurements being fixed as a certain ratio. In measuring the flow rate-static pressure characteristics, the loads are varied and the rotational speeds and current values of the motors are accordingly varied. At that time, changes N in one of the rotational speed N1 of the first motor 11 and the rotational speed N2 of the second motor 19 or changes N in total (|N1|+|N2|) of the rotational speed N1 of the first motor 11 and the rotational speed N2 of the second motor 19 as well as changes I in one of the motor current value I1 of the first motor 11 and the motor current value I2 of the second motor 19 or changes I in total (|I1|+|I2|) of the motor current value I1 of the first motor 11 and the motor current value I2 of the second motor 19 are also measured. The data thus obtained is prepared as first basic data. Next, the ratio of rotational speeds, N1:N2, is changed and the flow rate-static pressure characteristics are measured each time. Then, a maximum efficiency point is obtained for each ratio of rotational speeds. Thus, second basic data are prepared, defining a relationship among the measured flow rate-static pressure characteristic, the ratio of rotational speeds, and the maximum efficiency point, as illustrated in FIG. 17.

The first and second basic data should be stored in a memory of the control apparatus 27 in advance.

Figure 16:
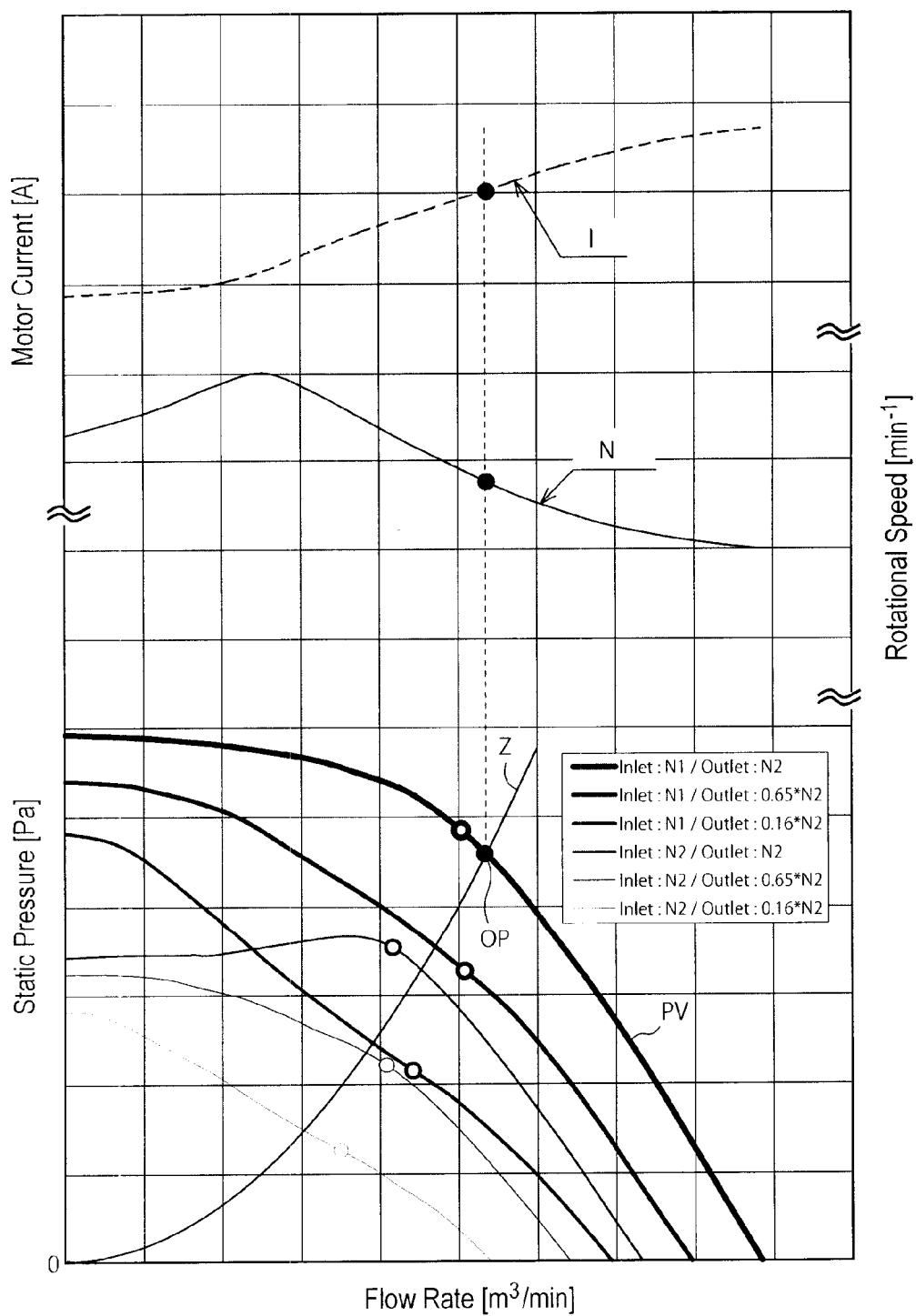
FIG. 16 is a graph showing example first basic data.

Referring to FIG. 15, the aforementioned first and second basic data are read from the memory in step ST 101. Timer counting is started in step ST 102. The timer counts the time until the system of this embodiment is reset. Next in step ST103, the first and second motors 11 and 19 of the counter-rotating axial-flow fan 1 to be controlled, which has been installed in a system including the object to be cooled 29, is rotated using the same ratio of rotational speeds as that used in the data measurements to obtain the first basic data. Then in step ST104, one of the rotational speed N1 of the first motor 11 and the rotational speed N2 of the second motor 19 or the total rotational speed N of the first and second motors 11 and 19 as well as one of the motor current value of the first motor 11 and the motor current value of the second motor 19 or the total motor current value I of the first and second motors 11 and 19 are detected based on outputs from the Hall devices 41 and 43 of FIG. 1 as well as outputs from the first and second current sensors 37 and 39 of FIG. 1. The total rotational speed N may be hereinafter referred to simply as the rotational speed. Also, the total motor current value I may be hereinafter referred to simply as the motor current value. As illustrated in FIG. 16, a system impedance curve Z is obtained using the motor current value I and the rotational speed N of the first and second motors 11 and 19 as well as the first basic data in step ST105. The system impedance curve Z is constituted from a quadratic curve passing through a zero point and an operating point of the flow rate-static pressure characteristic.

Figure 17:
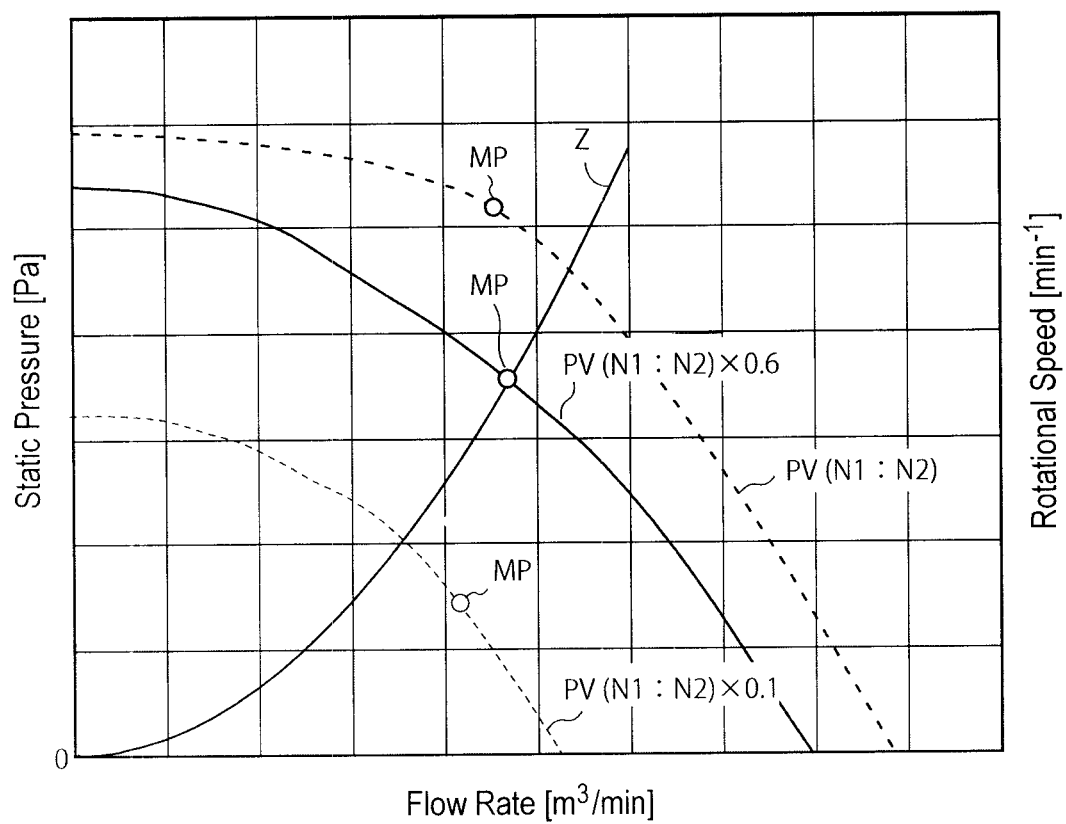
FIG. 17 is a graph showing example second basic data.

Next, the system impedance curve Z is compared with the second basic data as illustrated in FIG. 17. If the data sampling for the second basic data is very fine, a ratio of rotational speeds at which the maximum efficiency point MP falls on the system impedance curve Z is determined as an appropriate ratio of rotational speeds in a part of step ST 106. The appropriate ratio of rotational speeds as illustrated in FIG. 17 is N1:N2×0.6 where N1:N2 is the one used for measuring the first basic data. If data sampling for the second basic data is coarse, it is likely that the maximum point MP will not fall on the system impedance curve Z. In this case, a ratio of rotational speeds at which the system impedance curve approaches closest to the maximum efficiency point is determined as an appropriate ratio of rotational speeds in a part of step ST 106.

Then in step SST 107, the appropriate ratio of rotational speeds thus determined is fixed and the rotational speed N1 of the first motor 11 and the rotational speed N2 of the second motor 19 are controlled in a given cooling mode such that the temperature T of an object to be cooled 29 may be equal to or lower than the given reference temperature Tr.

As long as the flow rate remains unchanged, high system impedance means that the cooling time will be lengthened, thereby worsening the operating efficiency. For example, if a foreign object or material is sucked into the suction port or the discharge port is partially blocked, the system impedance will increase. If the system impedance increases while in operation, the temperature T of the object to be cooled 29 will be raised. In this embodiment, the system impedance is obtained, and a ratio of rotational speeds, N1:N2, preferable or appropriate for obtaining optimal operating efficiency is determined at that system impedance. The appropriate ratio of rotational speeds is maintained in cooling the object to be cooled 29 while controlling the rotational speeds N1 and N2 of the first and second motors 11 and 19. As a result, the operating efficiency is optimized at the time that the temperature T of the object to be cooled 29 becomes equal to or lower than the given reference temperature Tr.

Once the optimal rotational speeds and the optimal ratio of rotational speeds have been determined in step ST107, the rotational speeds thus determined should be maintained. However, ambient conditions of the system including the object to be cooled 29 may be varied and the system impedance may accordingly be varied. To cope with such situation, in this embodiment, the system is reset in step ST 110 and the program goes back to step ST 101 after the timer counting is completed in step 109. With this algorithm, the system impedance may be re-determined and the optimal ratio of rotational speeds may be determined. Even if the system impedance is varied, the operating efficiency may be restored to a preferable condition. The temperature T of the object to be cooled 29 is observed in step ST108. If the temperature T of the object to be cooled 29 is raised for some reason, the program proceeds to step ST110 and then back to step ST101 where controlling is re-started.

Figure 18:
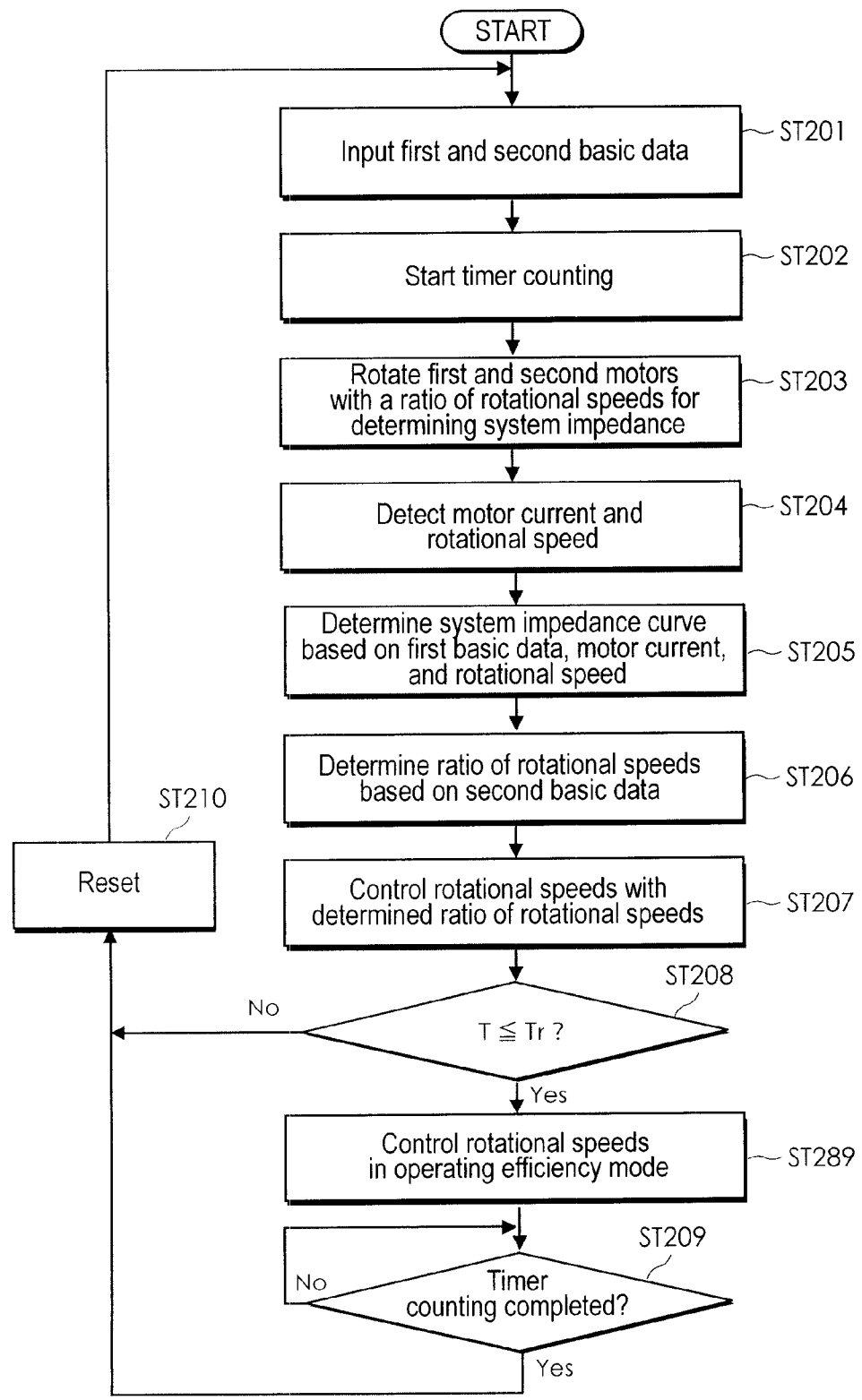
FIG. 18 is a flowchart showing an algorithm of a modified version of the program of FIG. 15.

If a large amount of comprehensive first and second basic data is available, optimal operating efficiency may be obtained. If the data are rough or data sampling is coarse, resulting operating efficiency will be somewhat worse. Referring to an algorithm of another program as illustrated in FIG. 18, to cope with such situation, the rotational speeds N1 and N2 of the first and second motors 11 and 19 are adjusted in the operating efficiency mode as with the aforementioned operating efficiency modes as illustrated in FIGS. 9 to 14. In this operating efficiency mode, step ST 289 is inserted between steps ST 208 and ST209. Steps in the flowchart of FIG. 18 are allocated reference numerals obtained by adding 100 to those of the corresponding steps in FIG. 15, and descriptions thereof are omitted.

In step ST289, for example after the temperature T of the object to be cooled 29 has become equal to or lower than the given reference temperature Tr, the rotational speed of one of the first and second motors 11 and 19 is decreased by a given rate of change in rotational speed smaller than the rate of change used in a given cooling mode until the temperature T of the object to be cooled is raised. The rotational speed of the one motor immediately before the temperature T of the object to be cooled 29 is raised is defined as a steady rotational speed of the one motor for a period during which the temperature T of the object to be cooled 29 is equal to or lower than the given reference temperature Tr. The rotational speed of the other motor is subsequently decreased by the given rate of change in rotational speed smaller than the rate of change used in the given cooling mode until the temperature T of the object to be cooled 29 is raised. The rotational speed of the other motor immediately before the temperature T of the object to be cooled 29 is raised is defined as a steady rotational speed of the other motor for a period during which the temperature T of the object to be cooled 29 is equal to or lower than the given reference temperature Tr. Also in step ST289 in FIG. 18 as with FIG. 13, the rotational speed of one of the first and second motors 11 and 19 may be decreased by a given rate of change in rotational speed smaller than the rate of change used in the given cooling mode until the temperature T of the object to be cooled 29 becomes higher than the given reference temperature Tr. The rotational speed of the one motor immediately before the temperature T of the object to be cooled 29 becomes higher than the given reference temperature Tr may be defined as a steady rotational speed of the one motor for a period during which the temperature T of the object to be cooled 29 is equal to or lower than the given reference temperature Tr. The rotational speed of the other motor may subsequently be decreased by the given rate of change in rotational speed smaller than the rate of change used in the given cooling mode until the temperature T of the object to be cooled 29 becomes higher than the given reference temperature Tr. The rotational speed of the other motor immediately before the temperature T of the object to be cooled 29 becomes higher than the given reference temperature Tr may be defined as a steady rotational speed of the other motor for a period during which the temperature T of the object to be cooled 29 is equal to or lower than the given reference temperature Tr.

With this algorithm, the fan may be operated with high operating efficiency by slightly changing the ratio of rotational speeds, N1:N2, between the first and second motors 11 and 19 that have been determined. Especially, if one of the first and second motors 11 and 19, namely, the first motor 11 that gives larger effects to the improvement of cooling performance than the other motor when rotated is defined as the one motor, the counter-rotating axial-flow fan 1 may be operated with higher operating efficiency.

Adjustments of the rotational speeds according to the aforementioned operating efficiency mode are not necessarily performed by changing the rotational speeds N1 and N2 of both the first and second motors 11 and 19. For example, the rotational speed of one of the first and second motors 11 and 19 may be decreased by a given rate of change in rotational speed smaller than that used in the given cooling mode until the temperature T of the object to be cooled 29 is raised. The rotational speed of the one motor immediately before the temperature T of the object to be cooled 29 is raised may be defined as a steady rotational speed for the one motor for a period during which the temperature T of the object to be cooled 29 is equal to or lower than the given reference temperature Tr.

Although not illustrated in the flowcharts, if one of the first and second motors 11 and 19 stops rotating, an alarm may be issued and the rotational speed of the other motor may be increased to a maximum rotational speed thereof. With this, the counter-rotating axial-flow fan will be operated as long as possible until the user who have heard the alarm adopts appropriate measures, thereby playing a maximum role as a cooling apparatus.

The temperature sensor 31 may be disposed in contact with the object to be cooled 29 as illustrated in FIG. 1. The temperature sensor 31 may be disposed apart from the object to be cooled 29. The temperature sensor 31 may arbitrarily be disposed. If the object to be cooled is the air inside the system, the temperature sensor 31 may be disposed at a position designated with reference numeral 31' in FIG. 1, inside or outside the housing 21.

INDUSTRIAL APPLICABILITY

According to the present invention, the rotational speed of the first motor and that of the second motor may be controlled according to the predetermined cooling efficiency mode, which gives priority to cooling the object to be cooled over reduced power consumption or operating efficiency of the counter-rotating axial-flow fan, if the temperature of the object to be cooled is high. As a result, the object to be cooled may quickly be cooled down to or below the given reference temperature. Once the object to be cooled has been cooled down to or below the given reference temperature, the rotational speed of the first motor and that of the second motor may be controlled according to the predetermined operating efficiency mode for reducing the power consumption of the counter-rotating axial-flow fan. As a result, the power consumption may be reduced after the object to be cooled has been cooled down, thereby enabling efficient operation of the counter-rotating axial-flow fan.

The system impedance may be obtained and a preferable ratio of rotational speeds required for obtaining optimal operating efficiency may be determined at the obtained system impedance. The preferable ratio of rotational speeds may be maintained to cool down the object to be cooled while controlling the rotational speeds of the first and second motors. At the time that the object to be cooled becomes equal to or lower than the given reference temperature, the operating efficiency will be optimized.

The invention claimed is:

1. A method of controlling a counter-rotating axial-flow fan, the counter-rotating axial-flow fan comprising:
    a housing including an air channel having a suction port at one end thereof and a discharge port at the other end thereof;
    a first impeller including a plurality of first blades that rotates in the air channel in the vicinity of the suction port;
    a first motor for rotating the first impeller around an axial line;
    a second impeller including a plurality of second blades that rotates in the air channel in the vicinity of the discharge port; and
    a second motor for rotating the second impeller counter to the first impeller around the axial line,
the method controlling the rotational speed of the first motor and that of the second motor such that the temperature of an object to be cooled may be equal to or lower than a given reference temperature, and comprising the steps of:
    starting the first and second motors, which have not been driven, according to a given starting mode;
    subsequently controlling the rotational speed of the first motor and that of the second motor according to a predetermined cooling efficiency mode, which gives priority to cooling the object to be cooled over reducing power consumption of the counter-rotating axial-flow fan, if the temperature of the object to be cooled is higher than the given reference temperature, wherein the cooling efficiency mode is configured to fix a ratio of rotational speeds between the first and second motors as expressed in N1:N2 where N1 denotes the rotational speed of the first motor and N2 denotes that of the second motor, and to change a rate of change in rotational speed for the first and second motors such that the temperature of the object to be cooled may be equal to or lower than the given reference temperature; and
    controlling the rotational speed of the first motor and that of the second motor according to a predetermined operating efficiency mode, which maintains the object to be cooled at a temperature equal to or lower than the given reference temperature and reduces the power consumption of the counter-rotating axial-flow fan, if the temperature of the object to be cooled is equal to or lower than the given reference temperature, wherein the operating efficiency mode is configured to fix the ratio of rotational speeds, N1:N2, between the first and second motors, to stepwise decrease the rotational speeds of the first and second motors by a rate of change in rotational speed smaller than the rate of change used in the cooling efficiency mode until the temperature of the object to be cooled is raised or becomes higher than the given reference temperature, and to define the rotational speeds of the first and second motors immediately before the temperature of the object to be cooled is raised or becomes higher than the given reference temperature, as respective steady rotational speeds of the first and second motors for a period during which the temperature of the object to be cooled is equal to or lower than the given reference temperature.

2. The method of controlling a counter-rotating axial-flow fan according to claim 1, wherein the starting mode is configured to increase the rotational speeds of the first and second motors up to respective target rotational speeds.

3. The method of controlling a counter-rotating axial-flow fan according to claim 1, wherein the starting mode is configured to gradually or stepwise increase the rotational speeds of the first and second motors for a given period after the motors have been started.

4. The method of controlling a counter-rotating axial-flow fan according to claim 1, wherein a temperature sensor is disposed in an atmosphere where the object to be cooled is placed, and it is determined based on an output from the temperature sensor whether or not the temperature of the object to be cooled is equal to or lower than the given reference temperature.

5. The method of controlling a counter-rotating axial-flow fan according to claim 1, wherein a temperature sensor is installed at the counter-rotating axial-flow fan, and it is determined based on an output from the temperature sensor whether or not the temperature of the object to be cooled is equal to or lower than the given reference temperature.

6. The method of controlling a counter-rotating axial-flow fan according to claim 1, wherein an alarm is issued if the rotational speeds of the first and second motors reach respective predetermined maximum rotational speeds.

7. The method of controlling a counter-rotating axial-flow fan according to claim 1, wherein if one of the first and second motors stops rotating, an alarm is issued and the rotational speed of the other motor is increased to a maximum rotational speed thereof.

8. A method of controlling a counter-rotating axial-flow fan, the counter-rotating axial-flow fan comprising:
- a housing including an air channel having a suction port at one end thereof and a discharge port at the other end thereof;
- a first impeller including a plurality of first blades that rotates in the air channel in the vicinity of the suction port;
- a first motor for rotating the first impeller around an axial line;
- a second impeller including a plurality of second blades that rotates in the air channel in the vicinity of the discharge port; and
- a second motor for rotating the second impeller counter to the first impeller around the axial line, the method controlling the rotational speed of the first motor and that of the second motor such that the temperature of an object to be cooled may be equal to or lower than a given reference temperature, and comprising the steps of:
- starting the first and second motors, which have not been driven, according to a given starting mode;
- subsequently controlling the rotational speed of the first motor and that of the second motor according to a predetermined cooling efficiency mode, which gives priority to cooling the object to be cooled over reducing power consumption of the counter-rotating axial-flow fan, if the temperature of the object to be cooled is higher than the given reference temperature; and
- controlling the rotational speed of the first motor and that of the second motor according to a predetermined operating efficiency mode, which maintains the object to be cooled at a temperature equal to or lower than the given reference temperature and reduces the power consumption of the counter-rotating axial-flow fan, if the temperature of the object to be cooled is equal to or lower than the given reference temperature.

9. The method of controlling a counter-rotating axial-flow fan according to claim 8, wherein the starting mode is configured to increase the rotational speeds of the first and second motors up to respective target rotational speeds.

10. The method of controlling a counter-rotating axial-flow fan according to claim 8, wherein the starting mode is configured to gradually or stepwisely increase the rotational speeds of the first and second motors for a given period after the motors have been started.

11. The method of controlling a counter-rotating axial-flow fan according to claim 8, wherein a temperature sensor is disposed in an atmosphere where the object to be cooled is placed, and it is determined based on an output from the temperature sensor whether or not the temperature of the object to be cooled is equal to or lower than the given reference temperature.

12. The method of controlling a counter-rotating axial-flow fan according to claim 8, wherein a temperature sensor is installed at the counter-rotating axial-flow fan, and it is determined based on an output from the temperature sensor whether or not the temperature of the object to be cooled is equal to or lower than the given reference temperature.

13. The method of controlling a counter-rotating axial-flow fan according to claim 8, wherein the cooling efficiency mode is configured to fix a ratio of rotational speeds between the first and second motors as expressed in N1:N2 where N1 denotes the rotational speed of the first motor and N2 denotes that of the second motor, and to change a rate of change in rotational speed for the first and second motors such that the temperature of the object to be cooled may be equal to or lower than the given reference temperature.

14. The method of controlling a counter-rotating axial-flow fan according to claim 13, wherein the operating efficiency mode is configured to:
- fix the ratio of rotational speeds, N1:N2, between the first and second motors;
- stepwisely decrease the rotational speeds of the first and second motors by a rate of change in rotational speed smaller than the rate of change used in the cooling efficiency mode until the temperature of the object to be cooled is raised or becomes higher than the given reference temperature; and
- define the rotational speeds of the first and second motors immediately before the temperature of the object to be cooled is raised or becomes higher than the given reference temperature, as respective steady rotational speeds for a period during which the temperature of the object to be cooled is equal to or lower than the given reference temperature.

15. The method of controlling a counter-rotating axial-flow fan according to claim 13, wherein the operating efficiency mode is configured to:
- decrease the rotational speed of one of the first and second motors by an amount of change or a rate of change in rotational speed smaller than the amount of change or the rate of change used in the cooling efficiency mode until the temperature of the object to be cooled is raised or becomes higher than the given reference temperature; and
- define the rotational speed of the one motor immediately before the temperature of the object to be cooled is raised or becomes higher than the given reference temperature as respective steady rotational speeds of the first and second motors for a period during which the temperature of the object to be cooled is equal to or lower than the given reference temperature.

16. The method of controlling a counter-rotating axial-flow fan according to claim 13, wherein the operating efficiency mode is configured to:
- decrease the rotational speed of one of the first and second motors that gives larger effects to the improvement of cooling performance than the other motor when rotated, by an amount of change or a rate of change in rotational speed smaller than the amount of change or the rate of change used in the cooling efficiency mode until the temperature of the object to be cooled is raised or becomes higher than the given reference temperature;
- define the rotational speed of the one motor immediately before the temperature of the object to be cooled is raised or becomes higher than the given reference temperature as a steady rotational speed of the one motor for a period during which the temperature of the object to be cooled is equal to or lower than the given reference temperature;
- subsequently decrease the rotational speed of the other motor by an amount of change or a rate of change in rotational speed smaller than the amount of change or the rate of change used in the cooling efficiency mode until the temperature of the object to be cooled is raised; and
- define the rotational speed of the other motor immediately before the temperature of the object to be cooled is raised as a steady rotational speed of the other motor for a period during which the temperature of the object to be cooled is equal to or lower than the given reference temperature.

17. The method of controlling a counter-rotating axial-flow fan according to claim 8, wherein the cooling efficiency mode is configured to change a ratio of rotational speeds between the first and second motors as expressed in N1:N2 where N1 denotes the rotational speed of the first motor and N2 denotes that of the second motor, such that the temperature of the object to be cooled may be equal to or lower than the given reference temperature.

18. The method of controlling a counter-rotating axial-flow fan according to claim 17, wherein the rotational speeds of the first and second motors are changed by respective constant amounts of change in rotational speed.

19. The method of controlling a counter-rotating axial-flow fan according to claim 18, wherein one of the first and second motors gives larger effects to the improvements of cooling performance than the other when the first and second motors are rotated; and the amount of change in rotational speed for the motor giving larger effects to the improvements of cooling performance is larger than the amount of change in rotational speed for the motor giving less large effects to the improvements of cooling performance.

20. The method of controlling a counter-rotating axial-flow fan according to claim 17, wherein the operating efficiency mode is configured to:

fix the ratio of rotational speeds, N1:N2, between the first and second motors, wherein the rotational speeds N1 and N2 of the first and second motors have finally been set in the cooling efficiency mode;

stepwisely decrease the rotational speeds of the first and second motors by a rate of change in rotational speed smaller than the rate of change used in the cooling efficiency mode until the temperature of the object to be cooled is raised; and define the rotational speeds of the first and second motors immediately before the temperature of the object to be cooled is raised as respective steady rotational speeds for a period during which the temperature of the object to be cooled is equal to or lower than the given reference temperature.

21. The method of controlling a counter-rotating axial-flow fan according to claim 17, wherein the operating efficiency mode is configured to:

decrease the rotational speed of one of the first and second motors by an amount of change or a rate of change in rotational speed smaller than the amount of change or the rate of change used in the cooling efficiency mode until the temperature of the object to be cooled is raised or becomes higher than the given reference temperature; and define the rotational speed of the one motor immediately before the temperature of the object to be cooled is raised or becomes higher than the given reference temperature as respective steady rotational speeds of the first and second motors for a period during which the temperature of the object to be cooled is equal to or lower than the given reference temperature.

22. The method of controlling a counter-rotating axial-flow fan according to claim 17, wherein the operating efficiency mode is configured to:

decrease the rotational speed of one of the first and second motors that gives larger effects to the improvement of cooling performance than the other motor when rotated, by an amount of change or a rate of change in rotational speed smaller than the amount of change or the rate of change used in the cooling efficiency mode until the temperature of the object to be cooled is raised;

define the rotational speed of the one motor immediately before the temperature of the object to be cooled is raised as a steady rotational speed of the one motor for a period during which the temperature of the object to be cooled is equal to or lower than the given reference temperature;

subsequently decrease the rotational speed of the other motor by an amount of change or a rate of change in rotational speed smaller than the amount of change or the rate of change used in the cooling efficiency mode until the temperature of the object to be cooled is raised; and define the rotational speed of the other motor immediately before the temperature of the object to be cooled is raised as a steady rotational speed of the other motor for a period during which the temperature of the object to be cooled is equal to or lower than the given reference temperature.

23. The method of controlling a counter-rotating axial-flow fan according to claim 8, wherein an alarm is issued if the rotational speeds of the first and second motors reach respective predetermined maximum rotational speeds.

24. The method of controlling a counter-rotating axial-flow fan according to claim 8, wherein if one of the first and second motors stops rotating, an alarm is issued and the rotational speed of the other motor is increased to a maximum rotational speed thereof.

25. A method of controlling a counter-rotating axial-flow fan, the counter-rotating axial-flow fan comprising:

a housing including an air channel having a suction port at one end thereof and a discharge port at the other end thereof;

a first impeller including a plurality of first blades that rotates in the air channel in the vicinity of the suction port;

a first motor for rotating the first impeller around an axial line;

a second impeller including a plurality of second blades that rotates in the air channel in the vicinity of the discharge port; and a second motor for rotating the second impeller counter to the first impeller around the axial line, the method controlling the rotational speed of the first motor and that of the second motor, and comprising the steps of:

preparing first basic data by obtaining from data measurements, wherein a counter-rotating axial-flow fan for data measurements is prepared and then flow rate-static pressure characteristics are measured with the ratio of rotational speeds between first and second motors of the counter-rotating axial-flow fan for data measurements being fixed as a certain ratio, and changes in rotational speed of one of the first and second motors of the counter-rotating axial-flow fan for data measurements or changes in total rotational speed of the first and second motors of the counter-rotating axial-flow fan for data measurements as well as changes in motor current value of one of the first and second motors of the counter-rotating axial-flow fan for data measurements or changes in total motor current value of the first and second motors of the counter-rotating axial-flow fan for data measurements are also measured;

preparing second basic data by obtaining from measurements, wherein a plurality of settings are defined for the ratio of rotational speeds between the first and second motors of the counter-rotating axial-flow fan for data measurements, a flow rate-static pressure characteristic is measured for each ratio of rotational speeds, and a maximum efficiency point is obtained for each ratio of rotational speeds, the second basic data defining a relationship among the measured flow rate-static pressure characteristic, the ratio of rotational speeds, and the maximum efficiency point for each setting;

obtaining a system impedance curve for a system in which the object to be cooled and the counter-rotating axial-flow fan to be controlled are installed, using the first basic data as well as the rotational speed of one of the first and second motors or the total rotational speed of the first and second motors and the motor current value of one of the first and second motors or the total motor current value of the first and second motors when the first and second motors are rotated with the same ratio of rotational speeds as that used in the data measurements to obtain the first basic data, the system impedance curve being constituted from a quadratic curve passing through a zero point and an operating point of the flow rate-static pressure characteristic;

comparing the system impedance curve with the second basic data;

determining as an appropriate ratio of rotational speeds a ratio of rotational speeds at which the maximum efficiency point falls on the system impedance curve or a ratio of rotational speeds at which the system impedance curve approaches closest to the maximum efficiency point; and fixing the appropriate ratio of rotational speeds thus determined and controlling the rotational speed of the first motor and that of the second motor in a given cooling mode such that the temperature of an object to be cooled may be equal to or lower than a given reference temperature.

26. The method of controlling a counter-rotating axial-flow fan according to claim 25, wherein the system is periodically reset, and a system impedance for the system is re-determined and an optimal ratio of rotational speeds is determined.

27. The method of controlling a counter-rotating axial-flow fan according to claim 25, wherein the rotational speed of one of the first and second motors is decreased by a given rate of change in rotational speed smaller than the rate of change used in the given cooling mode until the temperature of the object to be cooled is raised or becomes higher than the given reference temperature after the object to be cooled has become equal to or lower than the given reference temperature;

the rotational speed of the one motor immediately before the temperature of the object to be cooled is raised or becomes higher than the given reference temperature is defined as a steady rotational speed of the one motor for a period during which the temperature of the object to be cooled is equal to or lower than the given reference temperature;

the rotational speed of the other motor is subsequently decreased by the given rate of change in rotational speed until the temperature of the object to be cooled is raised or becomes higher than the given reference temperature; and the rotational speed of the other motor immediately before the temperature of the object to be cooled is raised or becomes higher than the given reference temperature is defined as a steady rotational speed of the other motor for a period during which the temperature of the object to be cooled is equal to or lower than the given reference temperature.

28. The method of controlling a counter-rotating axial-flow fan according to claim 25, wherein the rotational speed of one of the first and second motors that gives larger effects to the improvement of cooling performance than the other motor when rotated is decreased by a given rate of change in rotational speed smaller than the rate of change used in the given cooling mode until the temperature of the object to be cooled is raised or becomes higher than the given reference temperature after the temperature of the object to be cooled has become equal to or lower than the given reference temperature;

the rotational speed of the one motor immediately before the temperature of the object to be cooled is raised or becomes higher than the given reference temperature is defined as a steady rotational speed of the one motor for a period during which the temperature of the object to be cooled is equal to or lower than the given reference temperature;

the rotational speed of the other motor is subsequently decreased by the given rate of change in rotational speed until the temperature of the object to be cooled is raised or becomes higher than the given reference temperature; and the rotational speed of the other motor immediately before the temperature of the object to be cooled is raised or becomes higher than the given reference temperature is defined as a steady rotational speed of the other motor for a period during which the temperature of the object to be cooled is equal to or lower than the given reference temperature.

29. The method of controlling a counter-rotating axial-flow fan according to claim 25, wherein the rotational speed of one of the first and second motors is decreased by a given rate of change in rotational speed smaller than the rate of change used in the given cooling mode until the temperature of the object to be cooled is raised or becomes higher than the given reference temperature after the temperature of the object to be cooled has become equal to or lower than the given reference temperature; and the rotational speed of the one motor immediately before the temperature of the object to be cooled is raised or becomes higher than the given reference temperature is defined as a steady rotational speed of the one motor for a period during which the temperature of the object to be cooled is equal to or lower than the given reference temperature.

30. The method of controlling a counter-rotating axial-flow fan according to claim 25, wherein an alarm is issued if the rotational speeds of the first and second motors reach respective predetermined maximum rotational speeds.

31. The method of controlling a counter-rotating axial-flow fan according to claim 25, wherein if one of the first and second motors stops rotating, an alarm is issued and the rotational speed of the other motor is increased to a maximum rotational speed thereof.

* * * * *